US011386600B2

(12) United States Patent
Joo

(10) Patent No.: US 11,386,600 B2
(45) Date of Patent: Jul. 12, 2022

(54) SYSTEM AND METHOD FOR DISPLAYING VIRTUAL IMAGE THROUGH HMD DEVICE

(71) Applicant: SAMSUNG ELECTRONICS CO., LTD., Suwon-si (KR)

(72) Inventor: Ga-hyun Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/702,060

(22) Filed: Dec. 3, 2019

(65) Prior Publication Data

US 2020/0184694 A1    Jun. 11, 2020

Related U.S. Application Data

(63) Continuation of application No. 15/574,941, filed as application No. PCT/KR2015/005204 on May 22, 2015, now Pat. No. 10,521,941.

(51) Int. Cl.
*G06T 11/60*        (2006.01)
*G06F 3/0488*       (2022.01)
(Continued)

(52) U.S. Cl.
CPC .......... *G06T 11/60* (2013.01); *G02B 27/0172* (2013.01); *G06F 3/017* (2013.01);
(Continued)

(58) Field of Classification Search
CPC ....... G06T 11/60; G06T 11/00; G06T 19/006; G09G 2340/0464; G09G 2340/12;
(Continued)

(56) References Cited

U.S. PATENT DOCUMENTS 7,710,654 B2    5/2010  Ashkenazi et al.
9,213,405 B2   12/2015  Perez et al.
(Continued)

FOREIGN PATENT DOCUMENTS

CN    102566756 A    7/2012
CN    102981616 A    3/2013
(Continued)

OTHER PUBLICATIONS

Communication dated Oct. 30, 2019, issued by the State Intellectual Property Office of P.R. China in counterpart Chinese Application No. 201580081586.1.

(Continued)

*Primary Examiner* — Chante E Harrison
(74) *Attorney, Agent, or Firm* — Sughrue Mion, PLLC

(57) ABSTRACT

Provided are a system and method for displaying a virtual image through a head mounted display (HMD) device. A method by which a device displays a virtual image through an HMD device includes: receiving, from the HMD device, an object image of a real space captured through a camera included in the HMD device; determining a virtual image to be displayed at a particular position around the captured object; determining an operation of the virtual image corresponding to the object and the particular position; and providing the virtual image and operation information about the determined operation to the HMD device, wherein the provided virtual image is displayed through the HMD device.

18 Claims, 27 Drawing Sheets

(51) Int. Cl.
| | |
|---|---|
| *G06F 3/14* | (2006.01) |
| *G06F 3/0346* | (2013.01) |
| *G06T 11/00* | (2006.01) |
| *G02B 27/01* | (2006.01) |
| *G06F 3/01* | (2006.01) |
| *G09G 5/38* | (2006.01) |
| *H04N 13/30* | (2018.01) |

(52) U.S. Cl.
CPC .......... *G06F 3/0346* (2013.01); *G06F 3/0488* (2013.01); *G06F 3/14* (2013.01); *G06T 11/00* (2013.01); *H04N 13/30* (2018.05); *G02B 2027/014* (2013.01); *G02B 2027/0138* (2013.01); *G02B 2027/0178* (2013.01); *G09G 5/38* (2013.01); *G09G 2340/0464* (2013.01); *G09G 2340/12* (2013.01); *G09G 2354/00* (2013.01)

(58) Field of Classification Search
CPC ...... G09G 5/38; G09G 2354/00; G06F 3/011; G06F 3/017; G06F 3/0481; G06F 3/04815; G06F 3/0346; G06F 3/0488; G06F 3/14; G02B 2027/0138; G02B 2027/104; G02B 2027/0141; G02B 2027/0178; G02B 27/017; G02B 27/0172; G02B 27/0141; G02B 2027/014; H04N 13/30

See application file for complete search history.

(56) References Cited

U.S. PATENT DOCUMENTS

| | | | |
|---|---|---|---|
| 9,372,345 | B2 | 6/2016 | Fujimaki |
| 9,514,570 | B2 | 12/2016 | Keating et al. |
| 9,753,687 | B1 | 9/2017 | Cronin |
| 9,754,414 | B2 | 9/2017 | Kim et al. |
| 10,401,948 | B2 | 9/2019 | Ooi |
| 10,416,760 | B2 * | 9/2019 | Burns .................... G06F 9/451 |
| 10,860,100 | B2 | 12/2020 | Osterhout et al. |
| 2012/0249741 | A1 | 10/2012 | Maciocci |
| 2013/0044130 | A1 | 2/2013 | Geisner et al. |
| 2013/0050432 | A1 | 2/2013 | Perez et al. |
| 2013/0069985 | A1 * | 3/2013 | Wong .................... G06F 1/163 345/633 |
| 2013/0127980 | A1 | 5/2013 | Haddick et al. |
| 2013/0194164 | A1 | 8/2013 | Sugden |
| 2013/0201094 | A1 | 8/2013 | Travis et al. |
| 2013/0342571 | A1 | 12/2013 | Kinnebrew |
| 2014/0028850 | A1 | 1/2014 | Keating |
| 2014/0049559 | A1 | 2/2014 | Fleck et al. |
| 2014/0218361 | A1 | 6/2014 | Abe et al. |
| 2014/0210710 | A1 | 7/2014 | Shin et al. |
| 2014/0292807 | A1 * | 10/2014 | Raffa ................... G06T 19/006 345/633 |
| 2014/0320389 | A1 * | 10/2014 | Scavezze ............. G06K 9/6267 345/156 |
| 2014/0333666 | A1 | 11/2014 | Poulos |
| 2015/0091780 | A1 * | 4/2015 | Lyren ................. G02B 27/0172 345/8 |
| 2015/0301596 | A1 | 10/2015 | Qian et al. |
| 2015/0312561 | A1 * | 10/2015 | Hoof .................. G02B 27/0172 348/46 |
| 2015/0347846 | A1 | 12/2015 | Guzmán-Rivera |
| 2016/0033770 | A1 | 2/2016 | Fujimaki et al. |
| 2016/0133052 | A1 | 5/2016 | Choi |
| 2016/0179336 | A1 | 6/2016 | Ambrus |
| 2016/0371884 | A1 | 12/2016 | Benko |
| 2017/0192620 | A1 | 7/2017 | Kim |
| 2018/0174366 | A1 | 6/2018 | Nishibe |

FOREIGN PATENT DOCUMENTS

| | | |
|---|---|---|
| CN | 103853913 A | 6/2014 |
| CN | 103970268 A | 8/2014 |
| CN | 103970409 A | 8/2014 |
| CN | 104076513 A | 10/2014 |
| CN | 104488279 A | 4/2015 |
| JP | 2005128877 A | 5/2005 |
| JP | 2013-161267 A | 8/2013 |
| JP | 2013-205920 A | 10/2013 |
| JP | 2014109802 A | 6/2014 |
| KR | 10-2006-0014399 A | 2/2006 |
| KR | 10-2013-0000401 A | 1/2013 |
| KR | 10-2013-0101380 A | 9/2013 |
| KR | 10-2013-0130740 A | 12/2013 |
| KR | 10-2014-0080720 A | 7/2014 |
| KR | 10-2015-0044488 A | 4/2015 |

OTHER PUBLICATIONS

Communication dated Feb. 2, 2019 issued by the State Intellectual Property Office of P.R. China in counterpart Chinese Application No. 201580081586.1.

International Search Report and Written Opinion (PCT/ISA/210 and PCT/ISA/237), dated Feb. 19, 2016 by the International Searching Authority in International Application No. PCT/KR2015/005204.

Communication dated Jun. 2, 2020, issued by the State Intellectual Property Office of P.R. China in Chinese Application No. 201580081586.1.

Communication dated Jul. 8, 2020, issued by the Korean Intellectual Property Office in Korean Application No. 10-2014-0029261.

Communication dated Dec. 22, 2020 by the Korean Intellectual Property Office in Korean Application No. 10-2014-0029261.

* cited by examiner

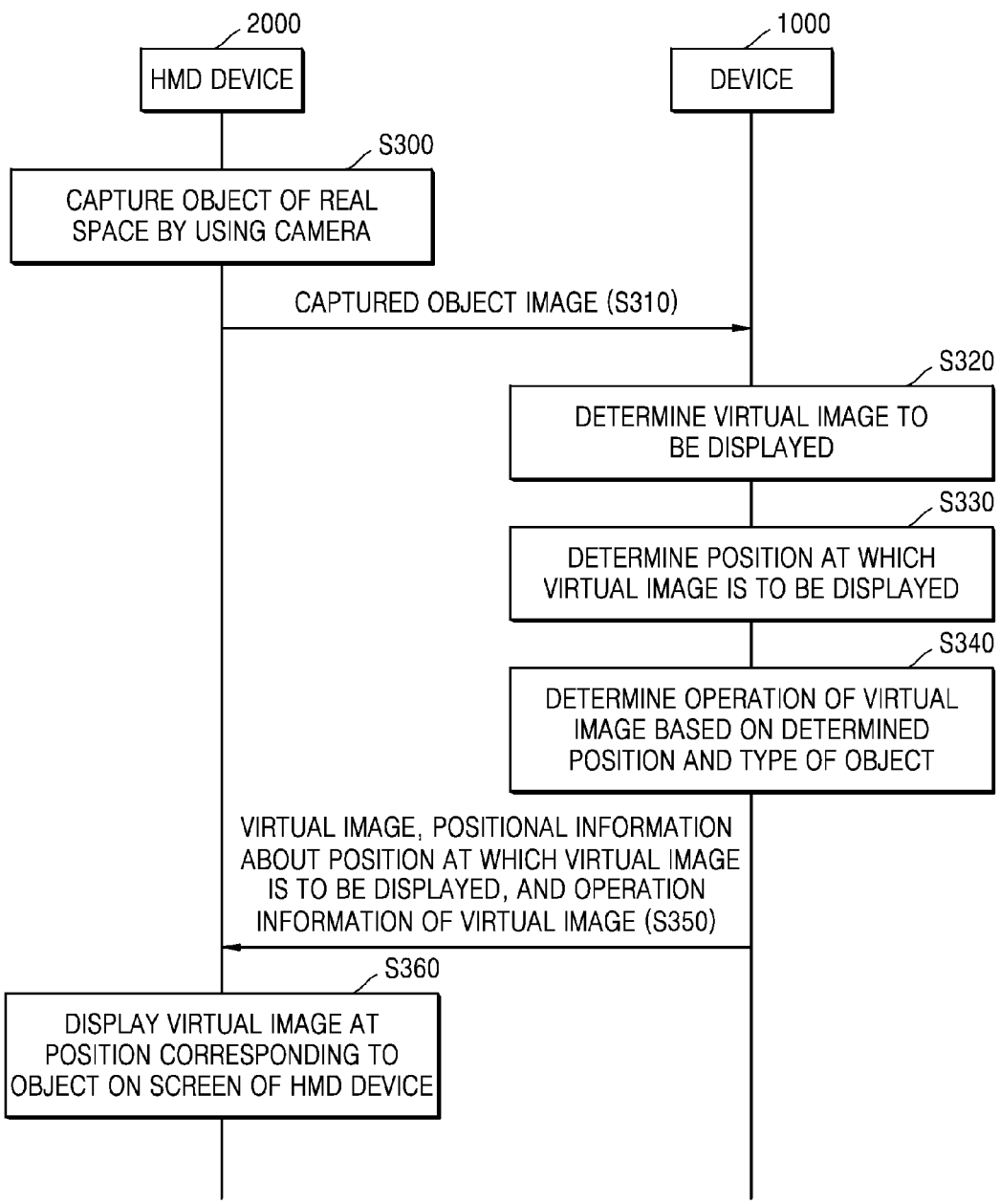

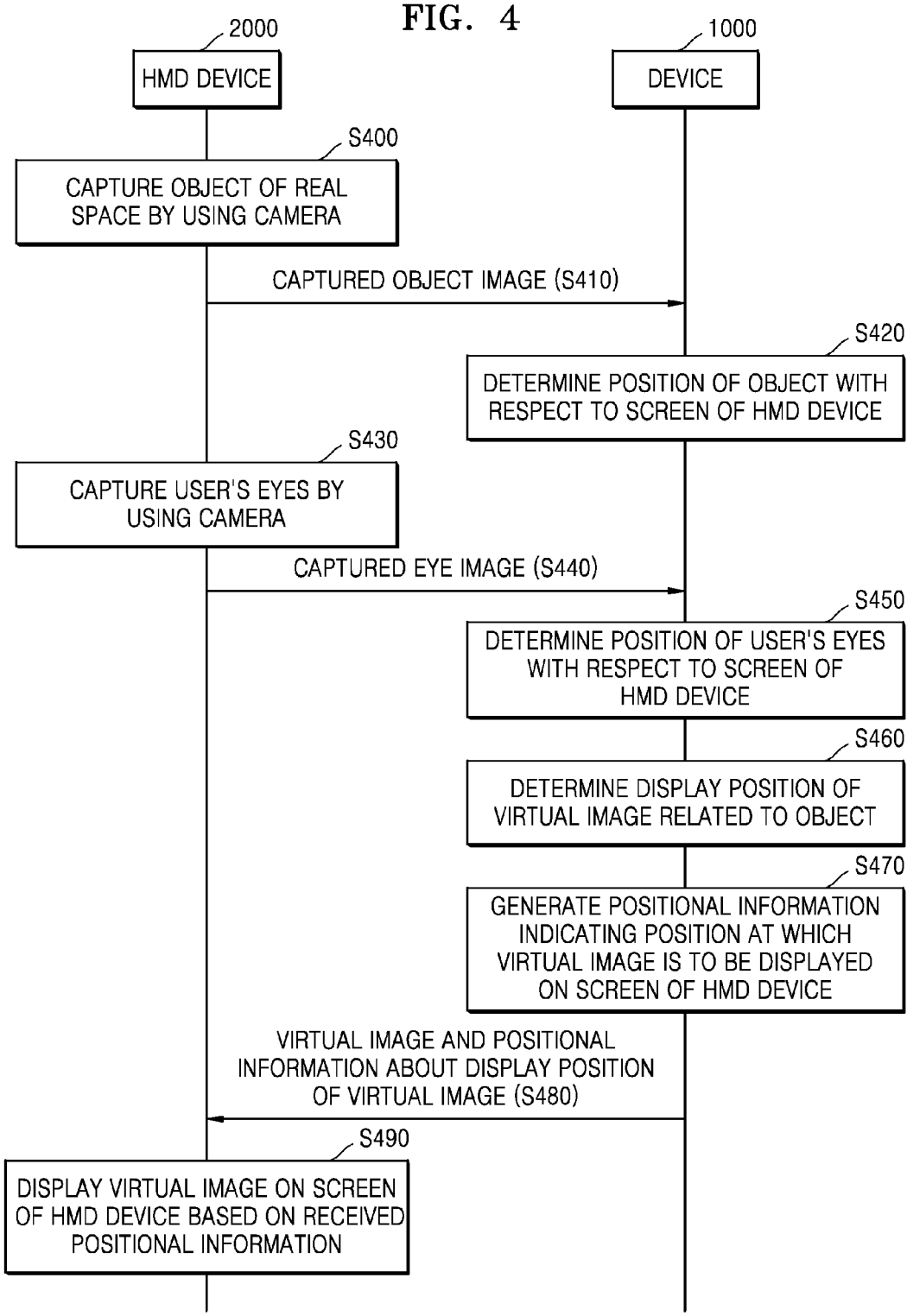

| TYPE OF VIRTUAL IMAGE (70) | TYPE OF OBJECT (72) | POSITION WITH RESPECT TO OBJECT (74) | USER INPUT (76) | OPERATION OF OBJECT (78) |
|---|---|---|---|---|
| DOG | SOFA | ON | NONE | LYING DOWN |
| | | | WAVING UP AND DOWN | SHAKING TAIL |
| | | BELOW | WAVING FROM SIDE TO SIDE | SHAKING HEAD |
| | | | NONE | SITTING |
| | | | WAVING UP AND DOWN | BARKING |
| | | | WHISTLING | MOVING TOWARD USER |
| | RICE BOWL | SIDE, BACK | NONE | EATING FOOD |
| | | | WAVING UP AND DOWN | GROWLING |
| | | FRONT | NONE | ASKING FOR FOOD |

FIG. 8

| TYPE OF VIRTUAL IMAGE (80) | TYPE OF OBJECT (82) | POSITION WITH RESPECT TO OBJECT (84) | USER INPUT (86) | OPERATION OF OBJECT (88) |
|---|---|---|---|---|
| DOG | SOFA | ON | NONE | SITTING |
| | | | WAVING UP AND DOWN | JUMPING |
| | | | WAVING FROM SIDE TO SIDE | SHAKING TAIL |
| | | BELOW | NONE | STANDING UP |
| | | | WAVING UP AND DOWN | JUMPING |
| | RICE BOWL | SIDE, BACK | WHISTLING | APPROACHING TO USER |
| | | | NONE | KNOCKING RICE BOWL |
| | | | WAVING UP AND DOWN | RUNNING AROUND RICE BOWL |
| | | FRONT | NONE | JUMPING |

SYSTEM AND METHOD FOR DISPLAYING VIRTUAL IMAGE THROUGH HMD DEVICE

CROSS-REFERENCE TO RELATED APPLICATIONS

This application is a continuation of U.S. application Ser. No. 15/022,959 filed Mar. 18, 2016, which is a national stage of International Application No. PCT/KR2015/005204, filed on May 22, 2015, the contents of all of which are incorporated herein by reference in their entirety.

TECHNICAL FIELD

The present disclosure relates to a system and method for displaying a virtual image associated with an object of a real space through a head mounted display (HMD) device.

BACKGROUND ART

Augmented reality technology is technology derived from virtual reality technology that uses computer graphics technology to create a virtual space similar to reality. The augmented reality technology refers to technology that combines a real space (reality) and a virtual space to make a virtual object appear as if existing in the real space. The augmented reality technology is mainly utilized to provide additional information about an object of a real space by showing a virtual image superimposed on the real space.

However, a conventional augmented reality technology merely provides information about an objects of a real space and variously operates a virtual image according to the object of the real space, which makes it difficult to variously utilize the virtual image in the real space.

DETAILED DESCRIPTION OF THE INVENTION

Technical Problem

Some embodiments provide a system and method for displaying a virtual image through a head mounted display (HMD) device, capable of displaying a virtual image that is movable in an operation corresponding to a position of an object and a position around the object.

Technical Solution

As a technical means for achieving the above-described technical problem, a first aspect of the present disclosure may provide a method by which a device displays a virtual image through a head mounted display (HMD) device, the method including: receiving, from the HMD device, an object image of a real space captured through a camera included in the HMD device; determining a virtual image to be displayed at a particular position around the captured object; determining an operation of the virtual image corresponding to the object and the particular position; and providing the virtual image and operation information about the determined operation to the HMD device, wherein the provided virtual image is displayed through the HMD device.

Also, the method may further include providing, to the HMD device, positional information about a position on a screen of the HMD device which corresponds to the particular position, wherein the virtual image may be displayed at the position on the screen of the HMD device based on the provided positional information.

Also, the method may further include receiving, from the HMD device, an eye image of a user of the HMD device, wherein the positional information may include a coordinate value of the position on the screen of the HMD device, and the coordinate value of the position at which the virtual image is to be displayed on the screen of the HMD device may be calculated by using the object image and the eye image.

Also, the operation of the virtual image may be previously set according to a type of the object.

Also, the operation of the virtual image may be previously set according to a relative position of the virtual image with respect to the object.

Also, the operation of the virtual image may be previously set according to a display mode of the virtual image.

Also, the method may further include: receiving state information of a peripheral device from the peripheral device around the device; and determining the operation of the virtual image corresponding to the state information of the peripheral device, wherein a state of the virtual image displayed through the HMD device may be changed according to the determined operation.

Also, the method may further include: identifying a display device around the device; and transmitting the virtual image and data associated with the operation of the virtual image to the identified display device, wherein the transmitted virtual image may be displayed on the display device based on the transmitted virtual image and the transmitted data associated with the operation of the virtual image.

Also, the method may further include: identifying a sound device around the device; and transmitting sound data associated with the virtual image to the identified sound device, wherein the transmitted sound data is output through the sound device according to the operation of the virtual image.

Also, the method may further include: receiving, from the HMD device, gesture information about a user's gesture captured through the HMD device; changing the operation of the virtual image based on the received gesture information; and providing operation information about the changed operation to the HMD device.

Also, a second aspect of the present disclosure may provide a device for displaying a virtual image through a head mounted display (HMD) device, the device including: a communicator configured to receive, from the HMD device, an object image of a real space captured through a camera included in the HMD device; and a controller configured to determine a virtual image to be displayed at a particular position around the captured object, to determine an operation of the virtual image corresponding to the object and the particular position, and to provide the virtual image and operation information about the determined operation to the HMD device, wherein the provided virtual image is displayed through the HMD device.

Also, the controller may be further configured to provide, to the HMD device, positional information about a position on a screen of the HMD device which corresponds to the particular position, and the virtual image is displayed at the position on the screen of the HMD device based on the provided positional information.

Also, the communicator may be further configured to receive, from the HMD device, an eye image of a user of the HMD device, the positional information may include a coordinate value of the position on the screen of the HMD device, and the coordinate value of the position at which the virtual image is to be displayed on the screen of the HMD device may be calculated by using the object image and the eye image.

Also, the operation of the virtual image may be previously set according to a type of the object.

Also, the operation of the virtual image may be previously set according to a relative position of the virtual image with respect to the object.

Also, the operation of the virtual image may be previously set according to a display mode of the virtual image.

Also, the communicator may be further configured to receive state information of a peripheral device from the peripheral device around the device, the controller may be further configured to determine the operation of the virtual image corresponding to the state information of the peripheral device, and a state of the virtual image displayed through the HMD device may be changed according to the determined operation.

Also, the controller may be further configured to identify a sound device around the device and transmit the virtual image and data associated with the operation of the virtual image to the identified display device, and the transmitted virtual image is displayed on the display device based on the transmitted virtual image and the transmitted data associated with the operation of the virtual image.

Also, the controller may be further configured to identify a sound device around the device and provide sound data associated with the virtual image to the identified sound device, and the transmitted sound data may be output through the sound device according to the operation of the virtual image.

Also, the communicator may be further configured to receive, from the HMD device, gesture information about a user's gesture captured through the HMD device, and the controller may be further configured to change the operation of the virtual image based on the received gesture information and to provide operation information about the changed operation to the HMD device.

Also, a third aspect of the present disclosure may provide a method by which a head mounted display (HMD) device displays a virtual image, the method including: capturing an image of an object of a real space by using a camera included in the HMD device; receiving, from a device, a virtual image to be displayed at a particular position around the object and operation information about an operation of the virtual image; and displaying the virtual image at a position corresponding the particular position on a screen of the HMD device, based on the operation information.

Also, a fourth aspect of the present disclosure may provide a non-transitory computer-readable recording medium having recorded thereon one or more programs including instructions for executing a method by which a device displays a virtual image through a head mounted display (HMD) device, the method including: receiving, from the HMD device, an object image of a real space captured through a camera included in the HMD device; determining a virtual image to be displayed at a particular position around the captured object; determining an operation of the virtual image corresponding to the object and the particular position; and providing the virtual image and operation information about the determined operation to the HMD device, wherein the provided virtual image is displayed through the HMD device.

Also, a fifth aspect of the present disclosure may provide a non-transitory computer-readable recording medium having recorded thereon one or more programs including instructions for executing a method by which a head mounted display (HMD) device displays a virtual image, the method including: capturing an image of an object of a real space by using a camera included in the HMD device; receiving, from a device, a virtual image to be displayed at a particular position around the object and operation information about an operation of the virtual image; and displaying the virtual image at a position corresponding to the particular position on a screen of the HMD device, based on the operation information.

DESCRIPTION OF THE DRAWINGS

FIG. 3 is a flowchart of a method by which a device provides information for displaying a virtual image to an HMD device, based on positions at which an object image captured through the HMD device and a virtual image are to be displayed, according to some embodiments.

FIG. 4 is a flowchart of a method by which a device determines a position at which a virtual image is to be displayed, according to some embodiments.

FIG. 7 is a diagram illustrating an example of a table used for determining an operation of a virtual image when an operation mode is a normal mode, according to some embodiments.

FIG. 8 is a diagram illustrating an example of a table used for determining an operation of a virtual image when an operation mode is a play mode, according to some embodiments.

MODE OF THE INVENTION

Figure 1:
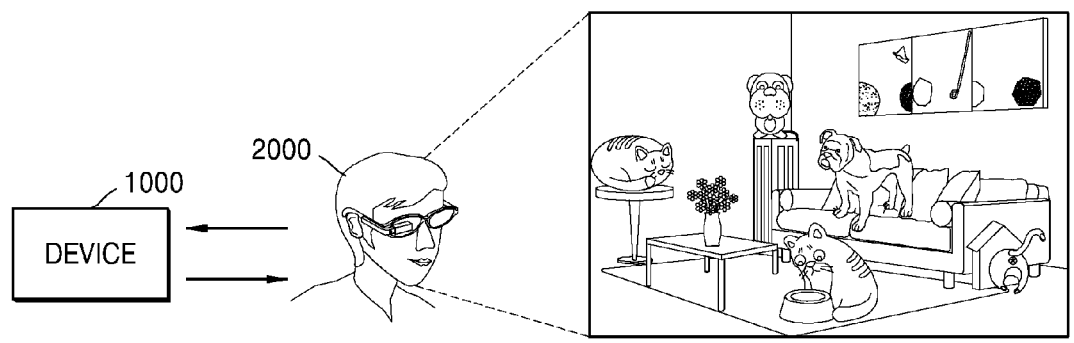
FIG. 1 is a diagram illustrating a system that allows a device to display a virtual image through a head mounted display (HMD) device, according to some embodiments.

Hereinafter, embodiments of the present invention will be described in detail with reference to the accompanying drawings so that those of ordinary skill in the art can easily carry out the present invention. The present invention may, however, be embodied in many different forms and should not be construed as limited to the embodiments set forth herein. In order to clearly describe the present invention, parts not related to the description are omitted, and like reference numerals denote like elements throughout the specification.

It will be understood that when a region is referred to as being "connected to" or "coupled to" another region, it may be directly connected or coupled to the other region or intervening regions may be present. It will be understood that terms such as "comprise", "include", and "have", when used herein, specify the presence of stated elements, but do not preclude the presence or addition of one or more other elements.

Hereinafter, the present invention will be described in detail with reference to the accompanying drawings.

FIG. 1 is a diagram illustrating a system that allows a device 1000 to display a virtual image through a head mounted display (HMD) device 2000, according to some embodiments.

Referring to FIG. 1, the device 1000 may display a virtual image around an object of a real space through the HMD device 2000 and change an operation of the displayed virtual image.

The HMD device 2000 may capture an image of the object of the real space and transmit the captured object image to the device 1000. Also, the device 1000 may receive, from the HMD device 2000, the object image captured through the HMD device 2000, and determine a virtual image to be displayed through the HMD device 2000. Also, the device 1000 may determine a position at which the virtual image is to be displayed, determine an operation of the virtual image, display the virtual image at a predetermined position through the HMD device 2000, and move the displayed virtual image according to a predetermined operation. In this case, object images of various operations may be displayed according to a type of the object and a position of the virtual image with respect to the object.

The object of the real space may be a thing to be captured by the HMD device 2000. For example, the object may be a thing such as a sofa, a table, or a chair displayed in a living room.

Also, the device 1000 may be a smartphone, a tablet PC, a PC, a smart TV, a mobile phone, a personal digital assistant (PDA), a laptop computer, a media player, a micro server, a global positioning system (GPS) device, an e-book terminal, a digital broadcasting terminal, a navigation, a kiosk, an MP3 player, a digital camera, or other mobile or non-mobile computing devices, but embodiments of the present disclosure are not limited thereto. Also, the device 1000 may include various devices, such as an electronic board or a touch table, which are capable of receiving a touch input. Also, the device 1000 may be a watch having a communication function and a data processing function. However, embodiments of the present disclosure are not limited thereto, and the device 1000 may include any type of device capable of receiving an object from the HMD device 2000 via a network and executing the object.

Also, the HMD device 2000 may be glasses or a headband having a communication function and a data processing function. However, embodiments of the present disclosure are not limited thereto.

The device 1000 may be connected to the HMD device 2000 via a network. Examples of the network may include any type of wireless network, such as a wired network, a mobile radio communication network, or a satellite communication network. For example, the network may be a local area network (LAN), a wide area network (WAN), or a value added network (VAN).

Figure 2:
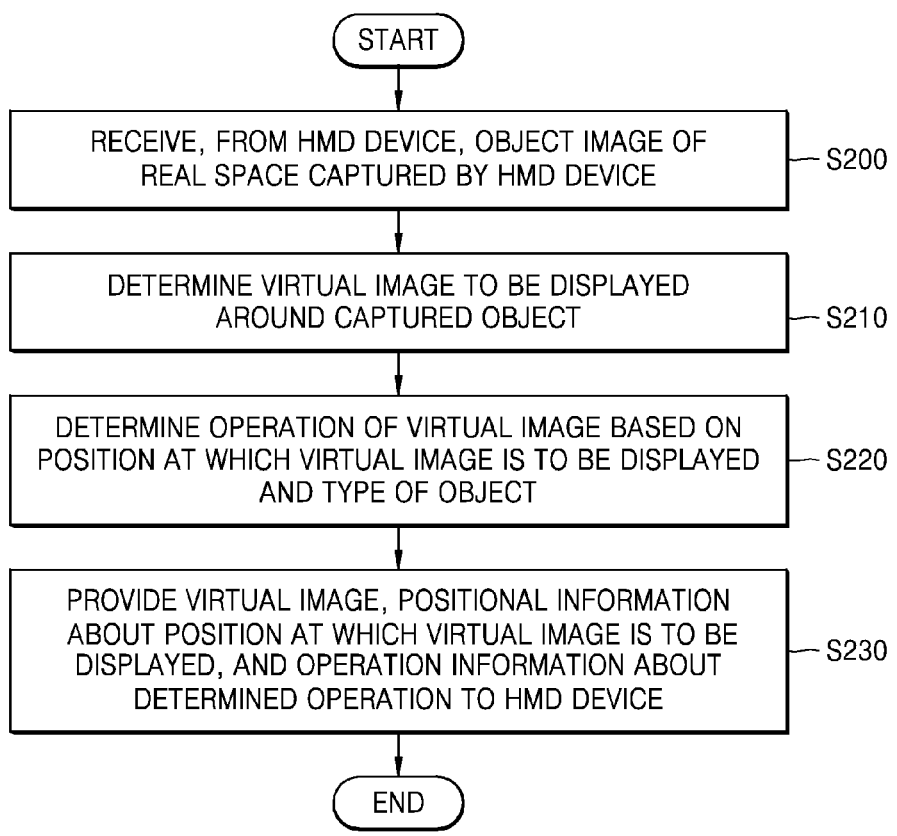
FIG. 2 is a flowchart of a method by which a device provides a virtual image related to an object image to an HMD device, based on the object image captured through the HMD device, according to some embodiments.

FIG. 2 is a flowchart of a method by which the device 1000 provides a virtual image related to an object image to the HMD device 2000, based on the object image captured through the HMD device 2000, according to some embodiments.

In operation S200, the device 1000 receives, from the HMD device 2000, the object image captured by the HMD device 2000. The HMD device 2000 may capture an object of a real space by using a camera provided in the HMD device 2000, and the device 1000 may receive an object image captured by the HMD device 2000 in real time.

In operation S210, the device 1000 determines a virtual image to be displayed around the captured object. The device 1000 may determine the virtual image to be displayed around the captured object, based on a user input for the device 1000. In this case, the device 1000 may display a user interface for selecting a virtual image on a screen of the device 1000, and may select a particular virtual image based on a user input via the user interface. The virtual image may be, for example, an image of a pet, such as a dog or a cat, but embodiments of the present disclosure are not limited thereto. The virtual image may include any type of image that is displayed around an object and is movable in a particular operation in a predetermined situation.

Also, the device 1000 may receive an identification value of the virtual image from the HMD device 2000. In this case, the HMD device 2000 may display a user interface for selecting a virtual image on a screen of the HMD device 2000, and may select a particular virtual image based on a user input via the user interface. Also, the HMD device 2000 may transmit, to the device 1000, the identification value of the virtual image elected by the user interface.

In operation S220, the device 1000 determines the operation of the virtual image based on the position at which the virtual image is to be displayed and the type of the object. The device 1000 may determine where the virtual image is to be displayed around the object, and may determine how to make the virtual image move according to the type of the object. For example, when the virtual image is a dog image and the dog image is determined to be displayed on a sofa, the device 1000 may confirm that the object is the sofa and the dog image is to be displayed on the sofa. Also, the device 1000 may determine to display an image of a dog lying down on the sofa.

In operation S230, the device 1000 may provide the virtual image, positional information about the position at which the virtual image is to be displayed, and operation information about the determined operation to the HMD device 2000. In this case, the device 1000 may calculate a coordinate value of a position on the screen of the HMD device 2000 at which the virtual image is to be displayed, according to relative positions of a user's eyes, the screen of the HMD device 2000, and the object of the real space.

For example, when the device 1000 determines to display the image of the dog lying down on the sofa, the device 1000 may provide the "dog image" as the virtual image, positional information indicating "on the sofa", and operation information indicating "lying down" to the HMD device 2000. Also, in this case, the positional information indicating "on the sofa" may be a coordinate value indicating the position on the screen of the HMD device 2000, and may be calculated by the device 1000 according to the relative positions of the user's eyes, the screen of the HMD device 2000, and the sofa of the real space.

FIG. 3 is a flowchart of a method by which the device 1000 provides information for displaying the virtual image to the HMD device 2000, based on positions at which the object image captured through the HMD device 2000 and the virtual image are to be displayed, according to some embodiments.

In operation S300, the HMD device 2000 captures an object of a real space by using a camera. The HMD device 2000 may capture the object of the real space in real time by using the camera provided in the HMD device 2000. The HMD device 2000 may be, for example, glasses having a communication function and a data processing function, and the HMD device 2000 worn by a user may capture an object of a real space by using the camera facing a user's front. Also, for example, an object image captured by the HMD device 2000 may be a moving image or continuous still images.

In operation S310, the HMD device 2000 provides the captured object image to the device 1000. The HMD device 2000 may transmit the captured object image to the device 1000 in real time. However, embodiments of the present disclosure are not limited thereto, and the HMD device 2000 may transmit the captured object image to the device 1000 at a predetermined period.

In operation S320, the device 1000 determines a virtual image to be displayed. The device 1000 may determine the virtual image to be displayed around the captured object, based on a user input for the device 1000. Also, the device 1000 may receive an identification value of the virtual image from the HMD device 2000.

The virtual image may be, for example, an image of a pet, such as a dog or a cat, but embodiments of the present disclosure are not limited thereto. The virtual image may include any type of image that is displayed around an object and is movable in a particular operation in a predetermined situation.

In operation S330, the device 1000 determines a position at which the virtual image is to be displayed. The device 1000 may determine where the virtual image is to be displayed around the object, based on a user input for the device 1000.

Also, the HMD device 2000 may determine where the virtual image is to be displayed around the object, based on a user input for the HMD device 2000, and the device 1000 may receive, from the HMD device 2000, a value indicating the position determined by the HMD device 2000. In this case, the user input for the HMD device 2000 may be a touch input or a button input by the user, but embodiments of the present disclosure are not limited thereto.

Also, the value indicating the position determined by the HMD device 2000 may be a value indicating a position around the object, such as "on the sofa" or "next to the sofa".

In operation S340, the device 1000 determines the operation of the virtual image based on the determined position and the type of the object. The device 1000 may determine the operation of the virtual image based on the type of the object and the position around the object at which the virtual image is to be displayed. For example, when the virtual image is a "dog image", the object is a "sofa", and the display position is "on the sofa", the device 1000 may determine the operation of the virtual image as "lying down". Also, for example, when the virtual image is a "dog image", the object is a "sofa", and the display position is "under the sofa", the device 1000 may determine the operation of the virtual image as "sitting". In this case, the operation of the virtual image corresponding to the type of the object and the display position of the virtual image may be previously set.

In operation S350, the device 1000 may provide the virtual image, positional information about the position at which the virtual image is to be displayed, and operation information about the determined operation to the HMD device 2000. In this case, the HMD device 2000 may capture an image of a user's eyes by using the camera facing the user, and provide the captured eye image of the user to the device 1000. Also, the positional information about the position at which the virtual image is to be displayed may be a coordinate value indicating the position at which the virtual image is to be displayed on the screen of the HMD device. For example, the device 1000 may calculate a coordinate value of a position at which the virtual image is to be displayed on the screen of the HMD device 2000, according to relative positions of the user's eyes, the screen of the HMD device 2000, and the object.

Also, the device 1000 may determine the display size of the virtual image by taking into account the size of the object viewed by the user, and provide size information about the determined size to the HMD device 2000.

In operation S360, the HMD device 2000 displays the virtual image at a position corresponding to the captured object on the screen of the HMD device 2000. The HMD device 2000 may display the virtual image on the screen of the HMD device 2000 based on the coordinate value received from the device 1000. Also, the HMD device 2000 may move the virtual image by a predetermined operation based on the operation information received from the device 1000.

FIG. 4 is a flowchart of a method by which the device 1000 determines the position at which the virtual image is to be displayed, according to some embodiments.

In operation S400, the HMD device 2000 captures an object of a real space by using the camera. The HMD device 2000 worn by a user may capture the object of the real space in real time by using the camera facing the user's front.

In operation S410, the HMD device 2000 provides the captured object image to the device 1000. The HMD device 2000 may transmit the captured object image to the device 1000 in real time. However, embodiments of the present disclosure are not limited thereto, and the HMD device 2000 may transmit the captured object image to the device 1000 at a predetermined period.

In operation S420, the device 1000 determines the position of the object with respect to the screen of the HMD device 2000. The position of the object with respect to the screen of the HMD device 2000 may be a position indicating where the object is placed from the screen of the HMD device 2000. Also, for example, the position of the object with respect to the screen of the HMD device 2000 may be specified by a direction in which the object is placed from the screen of the HMD device 2000 and a distance from the HMD device 2000 to the object. However, embodiments of the present disclosure are not limited thereto.

Also, the device 1000 may acquire product information of the HMD device 2000 and determine the position of the object with respect to the screen of the HMD device 2000 by using the product information of the HMD device 2000 and the object image received from the HMD device 2000. The product information of the HMD device 2000 may include, for example, information about a portion of the HMD device 2000 at which the camera capturing the object image is mounted, the capturing direction of the camera, information about the capturing condition of the camera, and information about the position of the screen in the HMD device 2000 and the screen size of the HMD device 2000, but embodiments of the present disclosure are not limited thereto.

In operation S430, the HMD device 2000 captures a user's eyes by using the camera. The HMD device 2000 worn by the user may capture the user's eyes in real time by using the camera facing the user.

In operation S440, the HMD device 2000 provides the captured eye image to the device 1000. The HMD device 2000 may transmit the captured eye image to the device 1000 in real time. However, embodiments of the present disclosure are not limited thereto, and the HMD device 2000 may transmit the captured eye image to the device 1000 at a predetermined period.

In operation S450, the device 1000 determines the position of the user's eyes with respect to the screen of the HMD device 2000.

The position of the eye with respect to the screen of the HMD device 2000 may be a position indicating where the eye is present from the screen of the HMD device 2000. Also, for example, the position of the eye with respect to the screen of the HMD device 2000 may be specified by a direction in which the eye is present from the screen of the HMD device 2000 and a distance from the HMD device 2000 to the eye. However, embodiments of the present disclosure are not limited thereto.

Also, the device 1000 may acquire product information of the HMD device 2000 and determine the position of the eye with respect to the screen of the HMD device 2000 by using the product information of the HMD device 2000 and the eye image received from the HMD device 2000. The product information of the HMD device 2000 may include, for example, information about a portion of the HMD device 2000 at which the camera capturing the eye image is mounted, the capturing direction of the camera, information about the capturing condition of the camera, and information about the position of the screen in the HMD device 2000 and the screen size of the HMD device 2000, but embodiments of the present disclosure are not limited thereto.

In operation S460, the device 1000 determines a display position of a virtual image related to the object. The device 1000 may determine where the virtual image is to be displayed around the object, based on a user input for the device 1000.

Also, the HMD device 2000 may determine where the virtual image is to be displayed around the object, based on a user input for the HMD device 2000, and the device 1000 may receive, from the HMD device 2000, a value indicating the position determined by the HMD device 2000. In this case, the user input for the HMD device 2000 may be a touch input or a button input by the user, but embodiments of the present disclosure are not limited thereto.

Also, the value indicating the position determined by the HMD device 2000 may be a value indicating a position around the object, such as "on the sofa" or "next to the sofa".

In operation S470, the device 1000 generates positional information indicating the position at which the virtual image is to be displayed on the screen of the HMD device 2000. The device 1000 may generate a coordinate value indicating the position at which the virtual image is to be displayed, based on the position of the eye with respect to the screen of the HMD device 2000 and the position of the object with respect to the screen of the HMD device 2000. In this case, the device 1000 may calculate a coordinate value indicating a position of a region in which the object is viewed by the user in an entire region of the screen when the user views the object.

Also, the device 1000 may determine the display size of the virtual image based on the size of the region in which the object is viewed by the user in the entire region of the screen when the user views the object.

In operation S480, the device 1000 provides the virtual image, the information about the display size of the virtual image, the positional information about the display position of the virtual image to the HMD device 2000.

In operation S490, the HMD device 2000 displays the virtual image on the screen of the HMD device 2000 based on the received positional information. The HMD device 2000 may display the virtual image at a particular position of the HMD device 2000 in a particular size by using the received positional information and the received information about the display size.

Figure 5A:
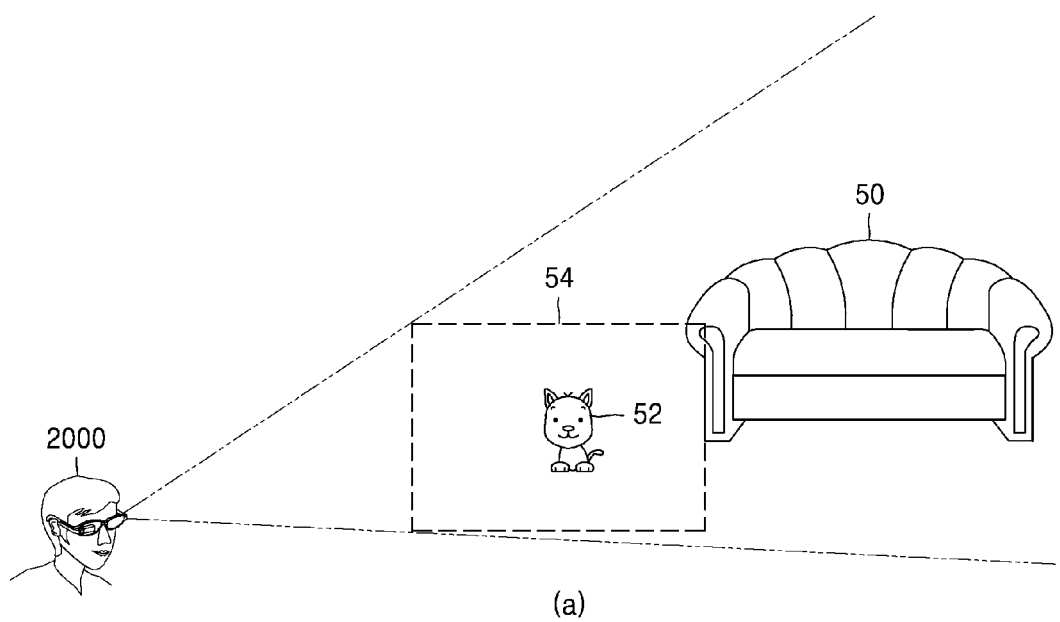
FIGS. 5A and 5B are diagrams illustrating an example in which a virtual image is displayed at a position corresponding to an object through an HMD device, according to some embodiments.
Figure 5B:
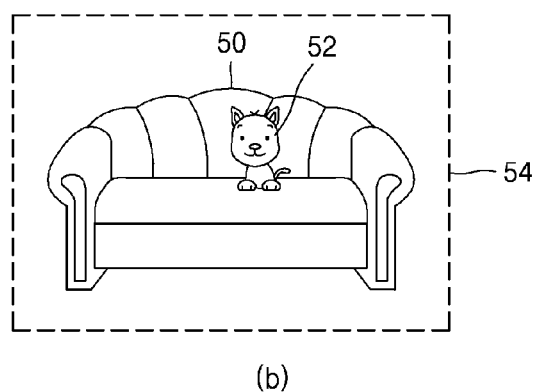

FIGS. 5A and 5B are diagrams illustrating an example in which a virtual image is displayed at a position corresponding to an object through an HMD device 2000, according to some embodiments.

FIG. 5A is a diagram illustrating an example in which a user wears the HMD device 2000 and views a sofa 50. Referring to FIG. 5A, a camera of the HMD device 2000 may capture the sofa 50 and provide an image of the captured sofa 50 to the device 1000. Accordingly, the device 1000 may determine a display size of a dog image 52 and determine a position at which the dog image 52 is to be displayed on the screen 54 of the device 1000. Also, the HMD device 2000 may display a virtual image on the screen 54 of the HMD device 2000.

Also, FIG. 5B is a diagram illustrating the object and the virtual image displayed to the user through the screen 54 of the HMD device 2000. As illustrated in FIG. 5B, the virtual image may be displayed in an appropriate size according to the size of the object viewed by the user. Also, the virtual image may be displayed at the position corresponding to the position of the object viewed by the user.

Figure 6:
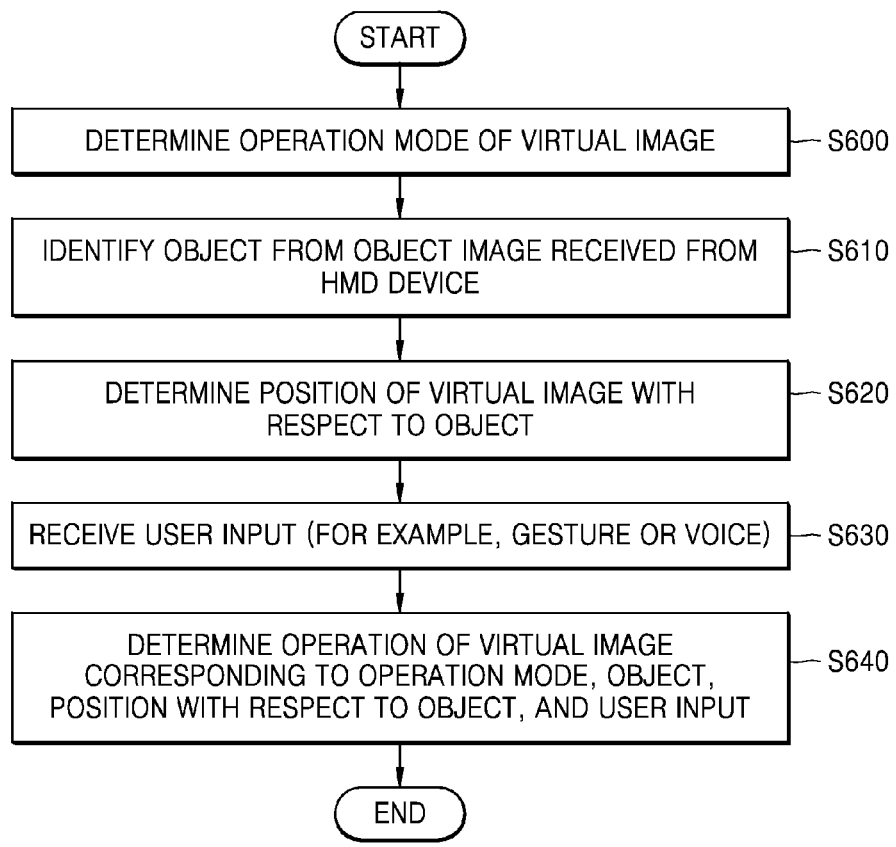
FIG. 6 is a flowchart of a method by which a device determines or changes an operation of a virtual image, according to some embodiments.

FIG. 6 is a flowchart of a method by which the device 1000 determines or changes an operation of a virtual image, according to some embodiments.

In operation S600, the device 1000 determines an operation mode of a virtual image. The operation mode is a mode set for a virtual image to perform a predetermined operation in a predetermined situation and may include, for example, a normal mode and a play mode.

Also, the device 1000 may determine the operation mode based on a user input for the device 1000. However, embodiments of the present disclosure are not limited thereto. The HMD device 2000 may determine the operation mode based on a user input for the HMD device 2000, and the device 1000 may receive information about the operation mode determined by the HMD device 2000.

In operation S610, the device 1000 identifies an object from an object image received from the HMD device 2000. The device 1000 may identify what the object is from the object image. For example, the device 1000 may identify a kind, a name, and the like of the object, but embodiments of the present disclosure are not limited thereto.

In operation S620, the device 1000 determines the position of the virtual image with respect to the object. The device 1000 may determine where the virtual image is to be displayed around the object, based on a user input for the device 1000. Also, the HMD device 2000 may determine where the virtual image is to be displayed around the object, based on a user input for the HMD device 2000, and the device 1000 may receive, from the HMD device 2000, a value indicating the position determined by the HMD device 2000. Also, the value indicating the position determined by the HMD device 2000 may be a value indicating a position around the object, such as "on the sofa" or "next to the sofa".

In operation S630, the device 1000 receives a user input for changing the operation of the virtual image. The device 1000 may receive a user input for the device 1000. The user input for the device 1000 may be, for example, a touch input, a button input, and a voice input, but embodiments of the present disclosure are not limited thereto.

Also, the device 1000 may receive the user input for the HMD device 2000 from the HMD device 2000. In this case, the user input for the HMD device 2000 may include, for example, a touch input, a button input, a voice input, and a gesture input for the HMD device 2000. Also, the HMD device 2000 may receive the gesture input for the HMD device 2000 by capturing a user's gesture by using the camera provided in the HMD device 2000.

In operation S640, the device 1000 determines the operation of the virtual image corresponding to the operation mode, the object, the position of the virtual image with respect to the object, and the user input. For example, the device 1000 may determine the operation of the object as "growling" when the operation mode is a normal mode, the virtual image is a "dog image", the object is a "rice bowl", the position of the virtual image with respect to the object is "next to", and the user input is a "gesture of waving up and down".

In this case, information about the operation of the virtual image corresponding to the operation mode, the object, the position of the virtual image with respect to the object, and the user input may be previously set. Also, the device 1000 may determine the operation of the virtual image based on a value set for the operation of the virtual image. A setup table for the operation of the virtual image will be described in more detail with reference to FIGS. 7 and 8.

FIG. 7 is a diagram illustrating an example of a table used for determining an operation of a virtual image when an operation mode is a normal mode, according to some embodiments.

Referring to FIG. 7, the table used for determining the operation of the virtual image in the normal mode may include a virtual image type field 70, an object type field 72, a position-with-respect-to-object field 74, a user input field 76, and an object operation field 78.

A type value of a virtual image to be displayed through the HMD device 2000 may be recorded in the virtual image type field 70, and information about an object captured by the HMD device 2000 may be recorded in the object type field 72. Also, a value indicating a display position of the virtual image with respect to the object may be recorded in the object-with-respect-to-object field 74. For example, "above", "below", next to", or "behind" may be recorded. Also, a user input value may be recorded in the user input field 76. For example, a type of a user's gesture may be recorded. Also, information about the operation of the object in the normal mode, which corresponds to the virtual image, the position of the virtual image with respect to the object, and the user input, may be recorded in the object operation field 78.

FIG. 8 is a diagram illustrating an example of a table used for determining an operation of a virtual image when an operation mode is a play mode, according to some embodiments.

Referring to FIG. 8, the table used for determining the operation of the virtual image in the play mode may include a virtual image type field 80, an object type field 82, a position-with-respect-to-object field 84, a user input field 86, and an object operation field 88.

A type value of a virtual image to be displayed through the HMD device 2000 may be recorded on the virtual image type field 80, and information about an object captured by the HMD device 2000 may be recorded on the object type field 82. Also, a value indicating a display position of the virtual image with respect to the object may be recorded on the object-with-respect-to-object field 84. For example, "above", "below", next to", or "behind" may be recorded. Also, a user input value may be recorded in the user input field 86. For example, a type of a user's gesture may be recorded. Also, information about the operation of the object in the play mode, which corresponds to the virtual image, the position of the virtual image with respect to the object, and the user input, may be recorded in the object operation field 88.

Figure 9:
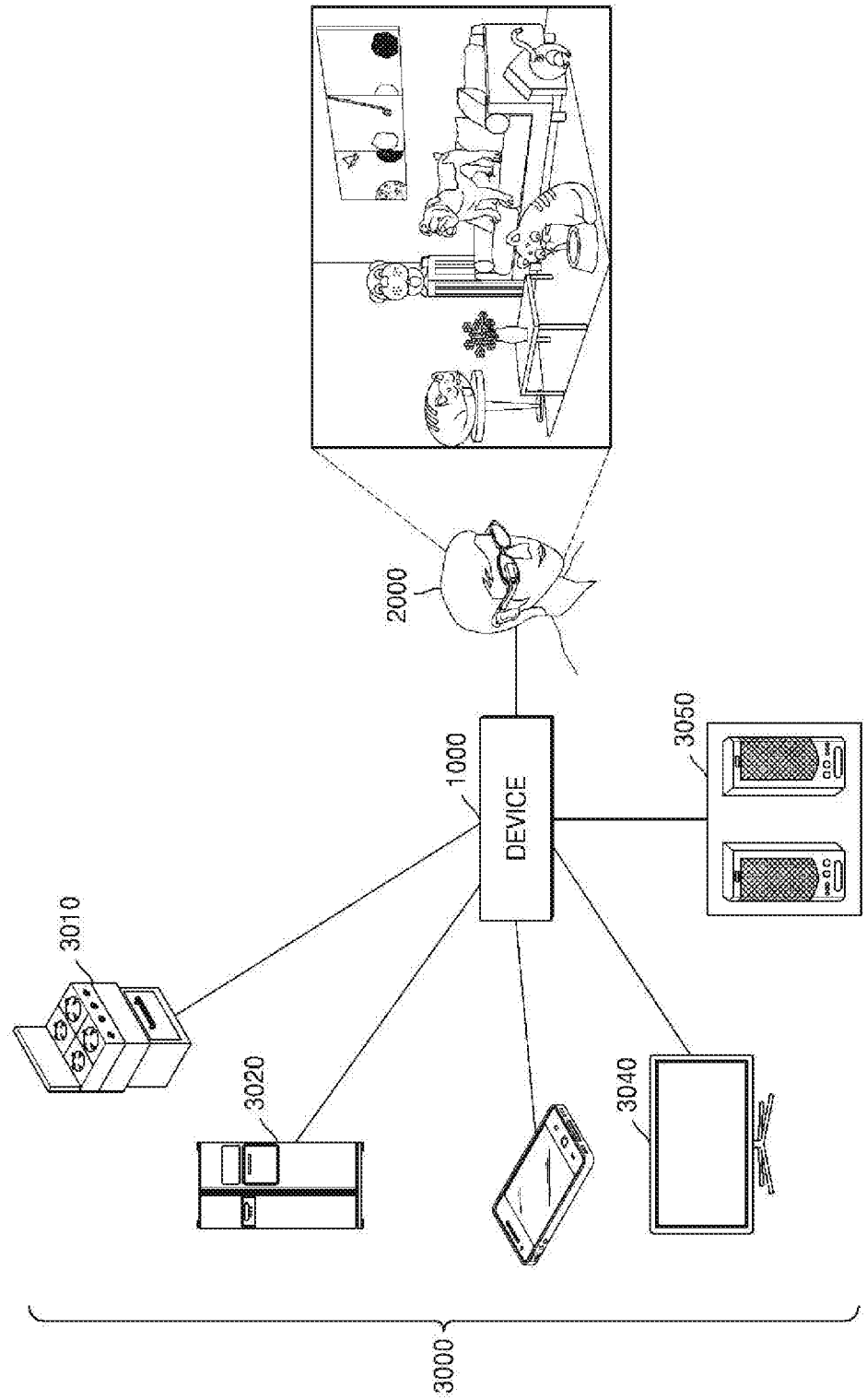
FIG. 9 is a diagram illustrating a system that allows a device to interwork with a peripheral device and an HMD device to display a virtual image through the HMD device, according to some embodiments.

FIG. 9 is a diagram illustrating a system that allows a device 1000 to interwork with a peripheral device 3000 and an HMD device 2000 to display a virtual image through the HMD device 2000, according to some embodiments.

Referring to FIG. 9, the device 1000 may identify at least one peripheral device 3000 around the device 1000, interwork with the peripheral device 3000 and the HMD device 2000, and control a virtual image.

Figure 10:
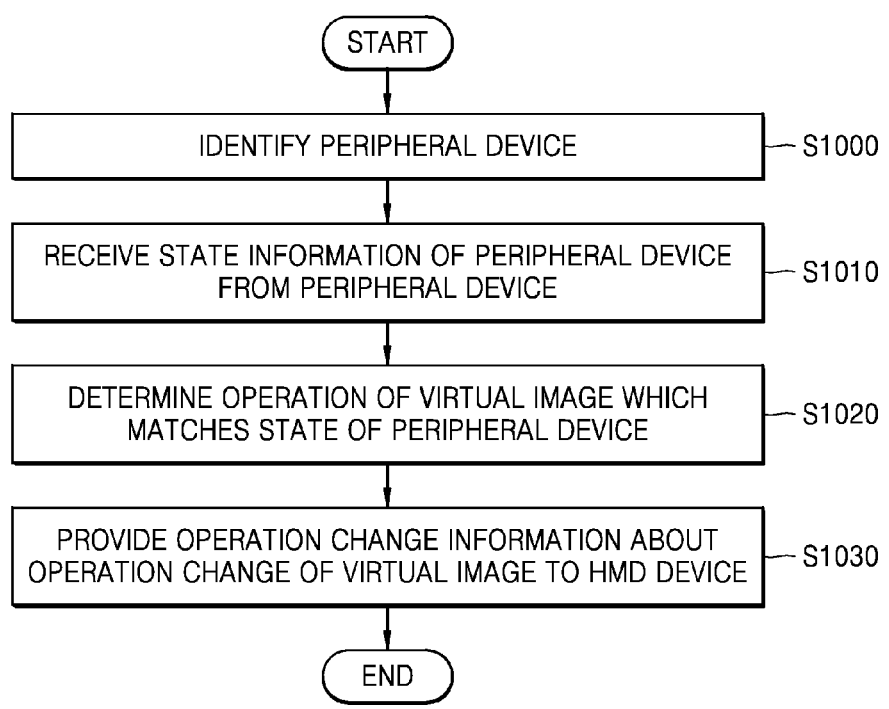
FIG. 10 is a flowchart of a method by which a device changes an operation of a virtual image displayed through an HMD device according to a state of a peripheral device, according to some embodiments.

FIG. 10 is a flowchart of a method by which the device 1000 changes an operation of a virtual image displayed through the HMD device 2000 according to a state of the peripheral device 3000, according to some embodiments.

In operation S1000, the device 1000 identifies the peripheral device 3000. The device 1000 may identify the peripheral device 3000 that can communicate with the device 1000. For example, when the device 1000 is located in the home, the device 1000 may identify home appliances that can be connected to the device 1000. For example, the device 1000 may identify a refrigerator, an oven, a TV, an audio component, and the like, but embodiments of the present disclosure are not limited thereto.

In operation S1010, the device 1000 receives state information of the peripheral device 3000 from the peripheral device 3000. The state information of the peripheral device 3000 may be information indicating a state associated with the operation of the peripheral device 3000. For example, the state information of the peripheral device 3000 may include information indicating whether the power of the peripheral device 3000 is turned on or off, information indicating the operation that is being executed by the peripheral device 3000, and information indicating whether the operation executed by the peripheral device 3000 is finished. However, embodiments of the present disclosure are not limited thereto.

In operation S1020, the device 1000 determines an operation of a virtual image that matches the state of the peripheral device 3000. The device 1000 may determine the operation of the virtual image that matches the state of the peripheral device 3000, based on the state information received from the peripheral device 3000. In this case, the operation of the virtual image that matches the state of the peripheral device 3000 may be previously set. For example, when the peripheral device 3000 is a refrigerator, the device 1000 may receive state information indicating that a door of the refrigerator has been opened for more than a preset time. Also, the device 1000 may determine the operation of the virtual image so as to notify that the door of the refrigerator is opened.

In operation S1030, the device 1000 provides operation change information about an operation change of the virtual image to the HMD device 2000. The device 1000 may provide the operation change information about the operation determined in operation S1020 to the HMD device 2000, and accordingly, the HMD device 2000 may change the operation of the virtual image that is being displayed.

Figure 11:
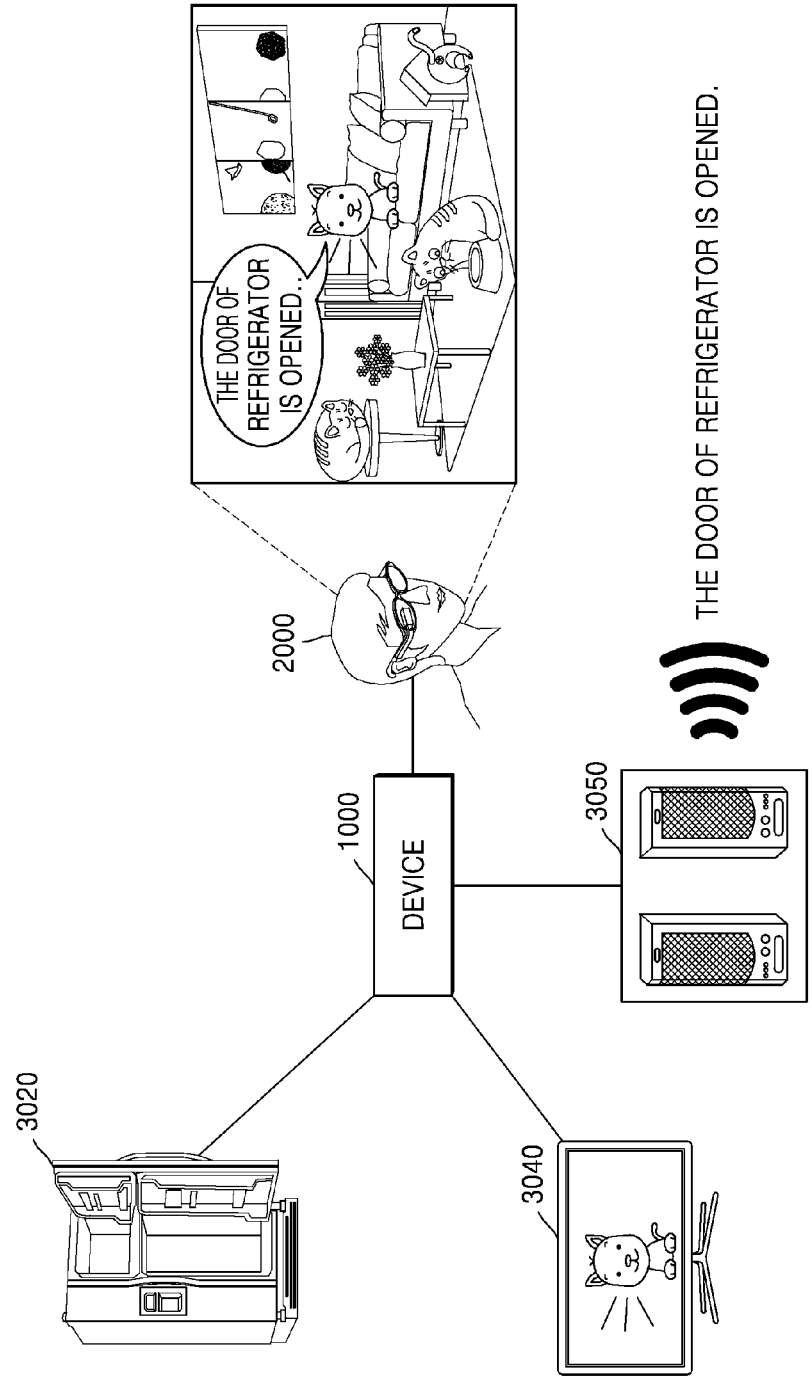
FIG. 11 is a diagram illustrating a system that allows a device to notify a user of a state of a refrigerator through an HMD device, a display device, and a sound device, according to some embodiments.

FIG. 11 is a diagram illustrating a system that allows a device 1000 to notify a user of a state of a refrigerator 3020 through an HMD device 2000, a display device 2040, and a sound device 3050, according to some embodiments.

Referring to FIG. 11, the device 1000 may interwork with the HMD device 2000, the refrigerator 3020, the display device 3040, and the sound device 3050 in the home. Also, the device 1000 may receive, from the refrigerator 3020, state information about the state of the refrigerator 3020, and may notify the user of the state of the refrigerator 3020 through the HMD device 2000, the display device 3040, and the sound device 3050. For example, a dog image on a screen of the HMD device 2000 may jump, and a speech balloon "The door of the refrigerator is open." may be displayed. Also, the dog image notifying that the door of the refrigerator is opened may be displayed on a screen of the display device 3040, and the sound device 3050 may output a sound "The door of the refrigerator is opened."

Figure 12:
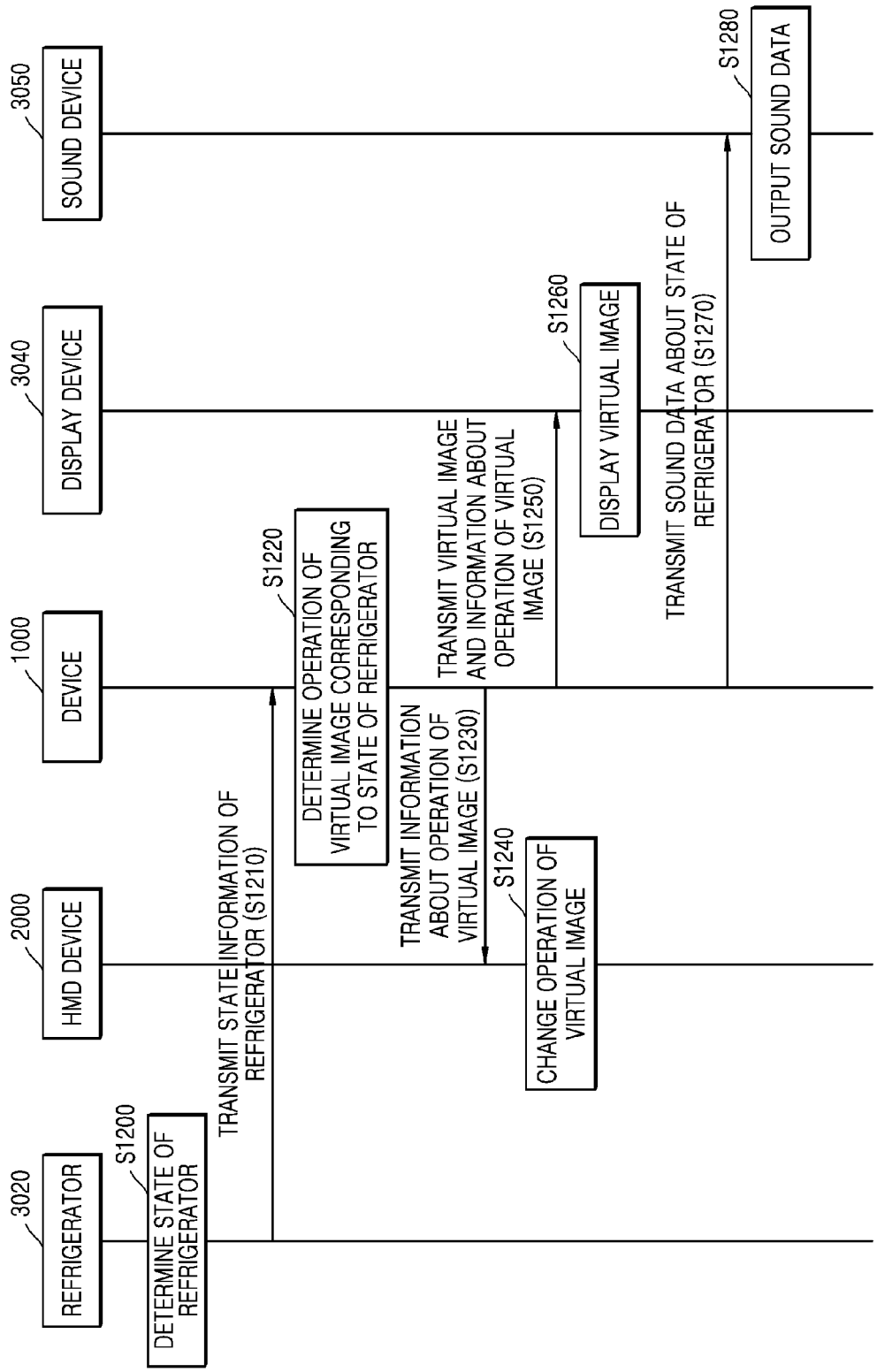
FIG. 12 is a flowchart of a method by which a device notifies a user of a state of a refrigerator through an HMD device, a display device, and a sound device, according to some embodiments.

FIG. 12 is a flowchart of a method by which a device 1000 notifies a user of a state of a refrigerator 3020 through an HMD device 2000, a display device 3040, and a sound device 3050, according to some embodiments.

In operation S1200, the refrigerator 3020 determines the state of the refrigerator 3020. The refrigerator 3020 may determine the state of the refrigerator by using various sensors provided in the refrigerator 3020. For example, the refrigerator 3020 may determine an internal temperature of the refrigerator 3020 and whether a door of the refrigerator 3020 is opened, but embodiments of the present disclosure are not limited thereto. The refrigerator 3020 may identify foods stored in the refrigerator 3020 by receiving food information from tags attached to the foods stored in the refrigerator 3020.

In operation S1210, the refrigerator 3020 provides state information of the refrigerator 3020 to the device 1000. When the state of the refrigerator 3020 corresponds to a preset state, the refrigerator 3020 may provide state information of the refrigerator 3020 to the device 1000. For example, a notification condition of the refrigerator 3020 may be set such that, when the door of the refrigerator 3020 has been opened for more than a predetermined time, or when the temperature of the refrigerator 3020 is a specific value or more, the refrigerator 3020 notifies the device 1000 of the state information of the refrigerator 3020. However, embodiments of the present disclosure are not limited thereto.

Also, the refrigerator 3020 may provide the state information of the refrigerator 3020 to the device 1000 at a preset period. Also, as the refrigerator 3020 is communicatively connected to the device 1000, the refrigerator 3020 may provide the state information of the refrigerator 3020 to the device 1000.

In operation S1220, the device 1000 determines an operation of a virtual image that corresponds to the state of the refrigerator 3020. For example, when the door of the refrigerator 3020 is in a state of being opened for more than a predetermined time, the device 1000 may determine the operation of the dog image, which is the virtual image, as "jump", so that the dog image is jumping to notify the user that the door of the refrigerator is opened.

In operation S1230, the device 1000 transmits operation information about the determined operation to the HMD device 2000. For example, the device 1000 may provide, to the HMD device 2000, operation information about the jumping operation of the dog corresponding to the state in which the door of the refrigerator 3020 has been opened for more than a predetermined time. Also, in this case, the device 1000 may provide, to the HMD device 2000, a text and sound data for notifying that the door of the refrigerator 3020 is opened.

In operation S1240, the HMD device 2000 changes the operation of the virtual image. The HMD device 2000 may change the operation of the virtual image being displayed on the screen of the HMD device 2000, based on the operation information received from the device 1000. For example, while the dog displayed on the screen of the HMD device 2000 is lying down, the HMD device 2000 may receive the operation information from the device 1000 and make the displayed dog jump.

In operation S1250, the device 1000 transmits the virtual image and information about the operation of the virtual image to the display device 3040. For example, the device 1000 may provide, to the display device 3040, the dog image and operation information about the jumping operation of the dog, corresponding to the state in which the door of the refrigerator 3020 has been opened for more than a predetermined time. Also, in this case, the device 1000 may provide, to the display device 3040, a text and sound data for notifying that the door of the refrigerator 3020 is opened.

In operation S1260, the display device 3040 displays the virtual image. The display device 3040 may display the virtual image of a predetermined operation by using the operation information and the virtual image received from the device 1000. For example, the display device 3040 may display the dog image on the screen of the display device 3040 and make the displayed dog jump. Also, the display device 3040 may receive synchronization information about the display of the dog image from the device 1000, and may synchronize the virtual image displayed on the screen of the display device 3040 with the virtual image displayed on the HMD device 2000 by using the synchronization information.

In operation S1270, the device 1000 transmits sound data about the state of the refrigerator 3020 to the sound device 3050. For example, the device 1000 may provide, to the sound device 3050, sound data for notifying that the door of the refrigerator 3020 is opened.

In operation S1280, the sound device 3050 outputs the sound data received from the device 1000. Also, the sound device 3050 may receive, from the device 1000, synchronization information for synchronizing the sound data with the virtual image displayed on the HMD device 2000, and may synchronize the sound data output from the sound device 3050 with the virtual image displayed on the HMD device 2000 by using the synchronization information.

Figure 13:
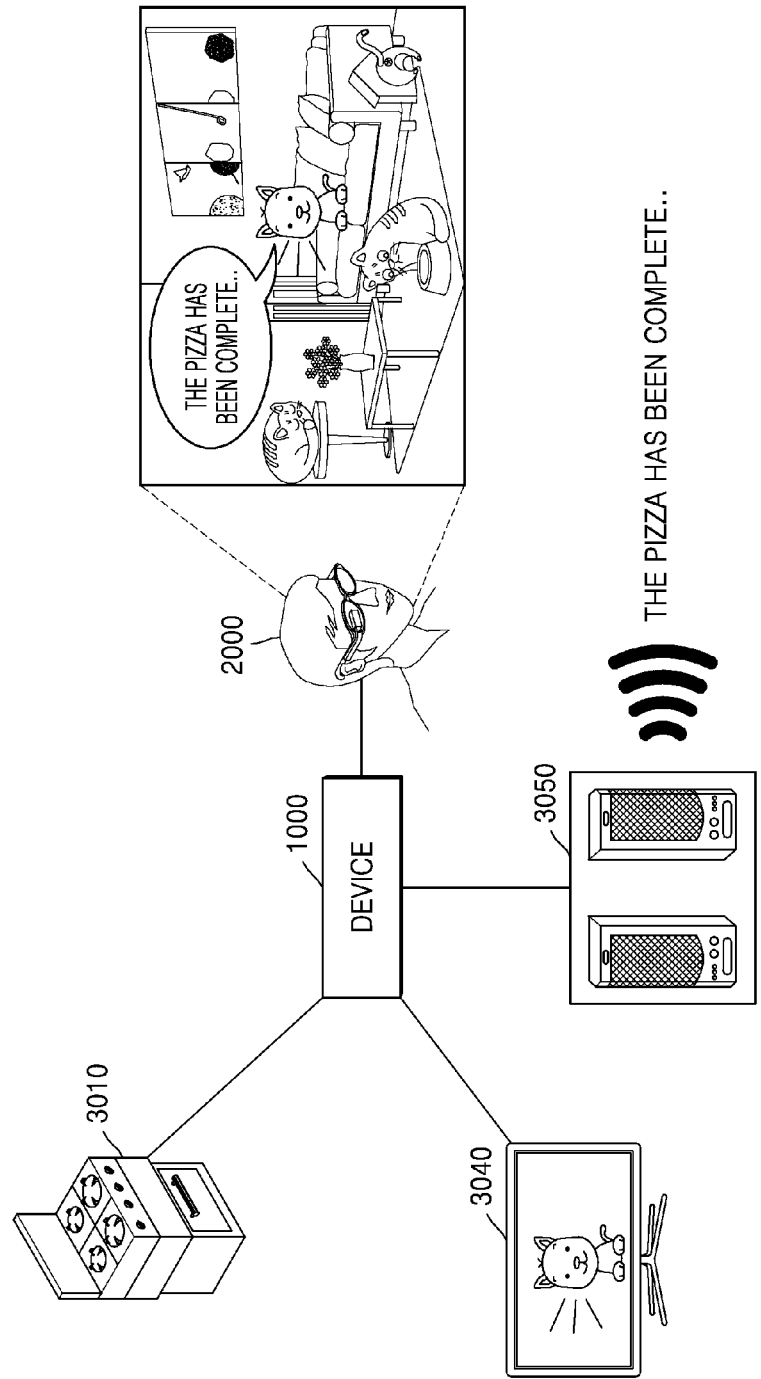
FIG. 13 is a diagram illustrating an example of a system that allows a device to notify a user of a state of an oven through an HMD device, a display device, and a sound device, according to some embodiments.

FIG. 13 is a diagram illustrating a system that allows a device 1000 to notify a user of a state of an oven 3010 through an HMD device 2000, a display device 2040, and a sound device 3050, according to some embodiments.

Referring to FIG. 13, the device 1000 may interwork with the HMD device 2000, the oven 3010, the display device 3040, and the sound device 3050 in the home. Also, the device 1000 may receive, from the oven 3010, state information about the state of the oven 3010, and may notify the user of the state of the oven 3010 through the HMD device 2000, the display device 3040, and the sound device 3050. The state of the oven 3010 may include a state as to whether the power of the oven 3010 is turned on or off, and a cooking state of food cooked in the oven 3010, but embodiments of the present disclosure are not limited thereto. For example, a dog image on a screen of the HMD device 2000 may jump, and a speech balloon "The pizza is complete." may be displayed. Also, the dog image notifying that the pizza is complete may be displayed on a screen of the display device 3040, and the sound device 3050 may output a sound "The pizza is complete."

Figure 14:
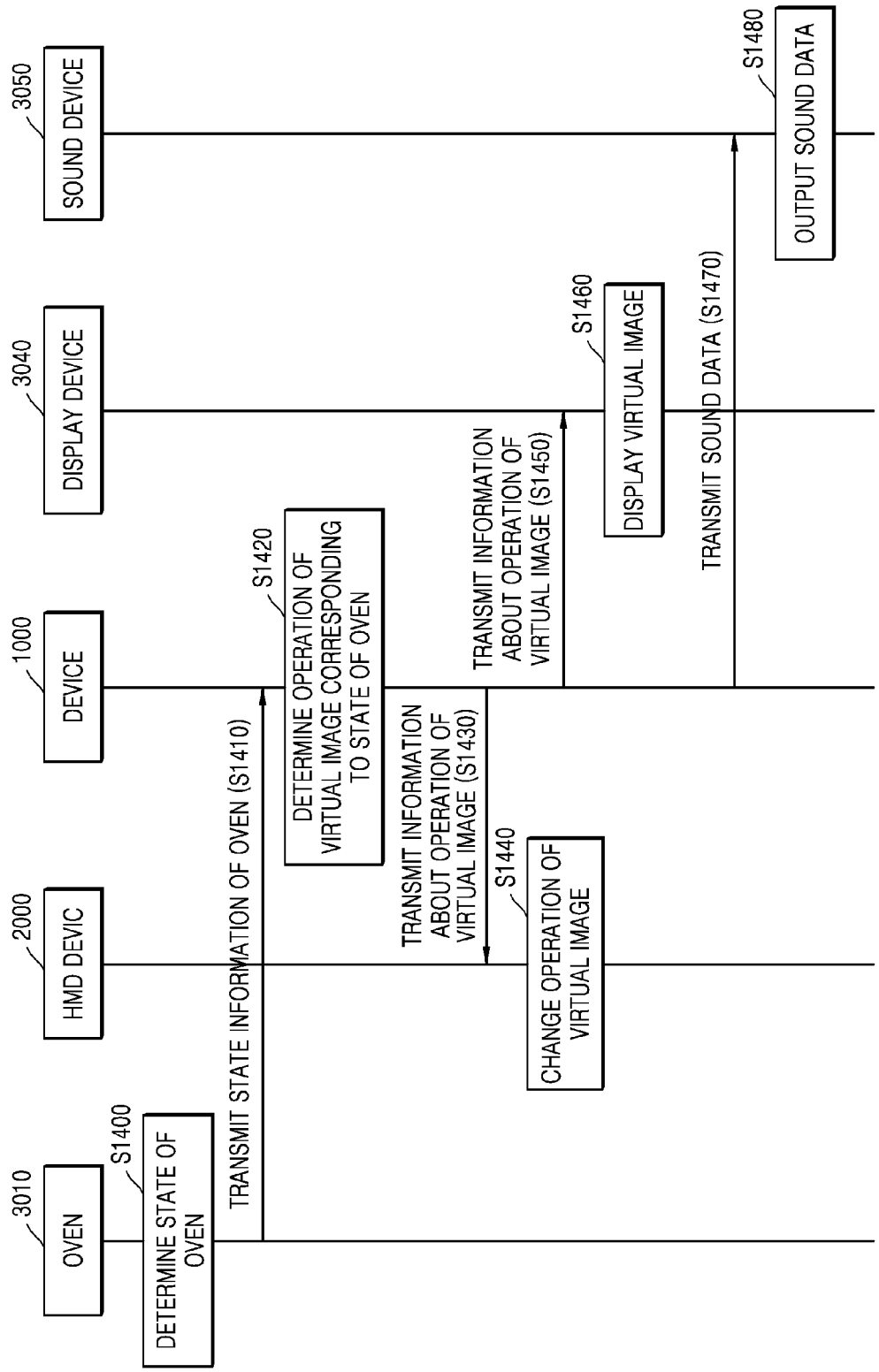
FIG. 14 is a flowchart of a method by which a device notifies a user of a state of an oven through an HMD device, a display device, and a sound device, according to some embodiments.

FIG. 14 is a flowchart of a method by which a device 1000 notifies a user of a state of an oven 3010 through an HMD device 2000, a display device 3040, and a sound device 3010, according to some embodiments.

In operation S1400, the oven 3010 determines the state of the oven 3010. The oven 3010 may determine the state of the oven 3010 by using various sensors provided in the oven 3010. For example, the oven 3010 may determine whether the power of the oven 3010 is turned on, an internal temperature of the oven 3010, and whether a door of the oven 3010 is opened. Also, the oven 3010 may determine a cooking state of food cooked by the oven 3010. Also, the oven 3010 may determine a recipe for cooking the food and a cooking step that must be operated by a current user. However, embodiments of the present disclosure are not limited thereto.

In operation S1410, the oven 3010 provides state information of the oven 3010 to the device 1000. When the state of the oven 3010 corresponds to a preset state, the oven 3010 may provide state information of the oven 3010 to the device 1000. For example, a notification condition of the oven 3010 may be set such that, when the cooking of the food by the oven 3010 has been completed, or when one of the detailed cooking steps has been completed, the oven 3010 notifies the device 1000 of the state information of the oven 3010. However, embodiments of the present disclosure are not limited thereto.

Also, the oven 3010 may provide the state information of the oven 3010 to the device 1000 at a preset period. Also, as the oven 3010 is communicatively connected to the device 1000, the oven 3010 may provide the state information of the oven 3010 to the device 1000.

In operation S1420, the device 1000 determines an operation of a virtual image that corresponds to the state of the oven 3010. For example, when the cooking of the food by the oven 3010 has been completed, the device 1000 may determine the operation of the dog image, which is the virtual image, as "jump", so that the dog image is jumping to notify the user that the cooking of the food has been completed.

In operation S1430, the device 1000 transmits operation information about the determined operation to the HMD device 2000. For example, the device 1000 may provide, to the HMD device 2000, operation information about the jumping operation of the dog corresponding to the completion of the cooking of the food by the oven 3010. Also, in this case, the device 1000 may provide, to the HMD device 2000, a text and sound data for notifying that the cooking of the food by the oven 3010 has been completed.

In operation S1440, the HMD device 2000 changes the operation of the virtual image. The HMD device 2000 may change the operation of the virtual image being displayed on the screen of the HMD device 2000, based on the operation information received from the device 1000. For example, while the dog displayed on the screen of the HMD device 2000 is lying down, the HMD device 2000 may receive the operation information from the device 1000 and make the displayed dog jump.

In operation S1450, the device 1000 transmits the virtual image and information about the operation of the virtual image to the display device 3040. For example, the device 1000 may provide, to the HMD device 3040, the dog image and the operation information about the jumping operation of the dog, corresponding to the completion of the cooking of the food by the oven 3010. Also, in this case, the device 1000 may provide, to the display device 3040, a text and sound data for notifying that the cooking of the food by the oven 3010 has been completed.

In operation S1460, the display device 3040 displays the virtual image. The display device 3040 may display the virtual image of a predetermined operation by using the operation information and the virtual image received from the device 1000. For example, the display device 3040 may display the dog image on the screen of the display device 3040 and make the displayed dog jump. Also, the display device 3040 may receive synchronization information about the display of the dog image from the device 1000, and may synchronize the virtual image displayed on the screen of the display device 3040 with the virtual image displayed on the HMD device 2000 by using the synchronization information.

In operation S1470, the device 1000 transmits sound data about the state of the oven 3010 to the sound device 3050. For example, the device 1000 may provide, to the sound device 3050, sound data for notifying that the cooking of the food by the oven 3010 has been completed.

In operation S1480, the sound device 3050 outputs the sound data received from the device 1000. Also, the sound device 3050 may receive, from the device 1000, synchronization information for synchronizing the sound data with the virtual image displayed on the HMD device 2000, and may synchronize the sound data output from the sound device 3050 with the virtual image displayed on the HMD device 2000 by using the synchronization information.

Figure 15:
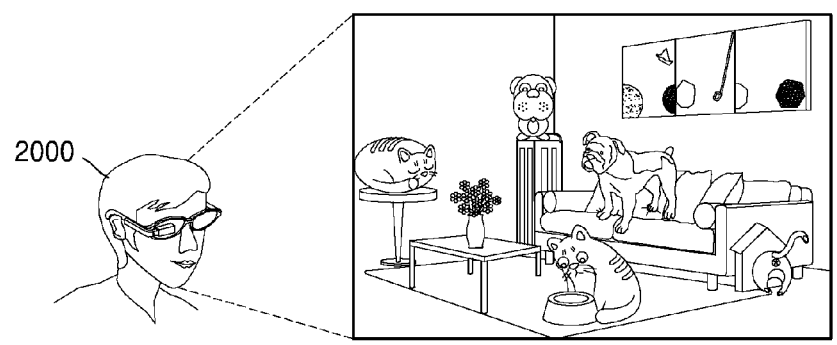
FIG. 15 is a diagram illustrating an example in which an HMD device displays a virtual image without interworking with a device, according to some embodiments.

FIG. 15 is a diagram illustrating an example in which an HMD device 2000 displays a virtual image without interworking with a device 1000, according to some embodiments.

Referring to FIG. 15, the HMD device 2000 may display the virtual image without interworking with the device 1000, and may execute the functions of the HMD device 2000 and the device 1000 described with reference to FIGS. 2 to 4.

The HMD device 2000 may display a virtual image around an object of a real space and change an operation of the displayed virtual image. The HMD device 2000 may capture an image of the object of the real space, and determine a virtual image to be displayed, based on the captured object image. Also, the HMD device 2000 may determine a position at which the virtual image is to be displayed, and determine an operation of the virtual image. Also, the HMD device 2000 may display the virtual image at a predetermined position, and move the displayed virtual image according to a predetermined operation.

Figure 16:
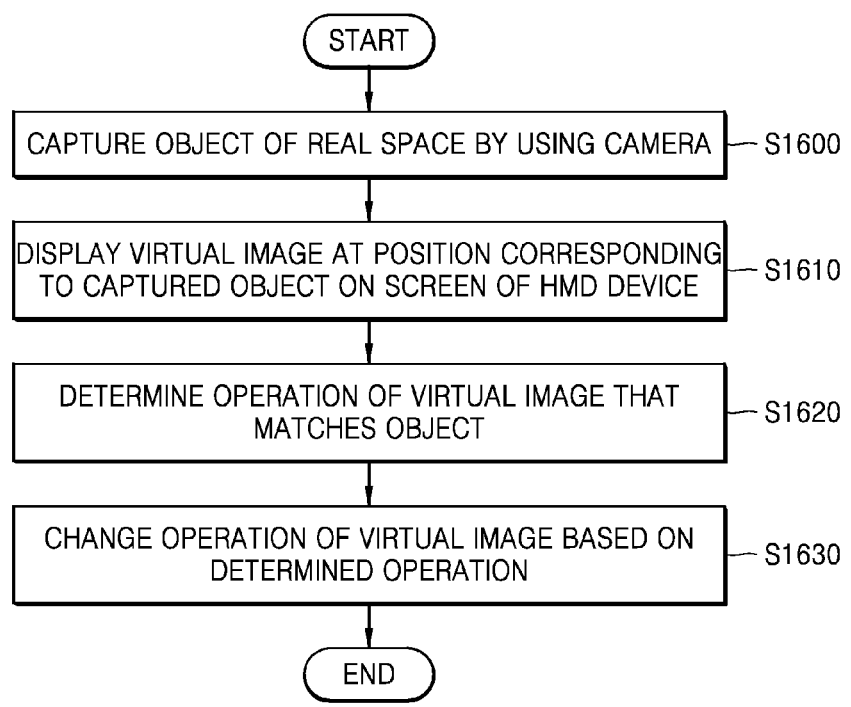
FIG. 16 is a flowchart of a method by which an HMD device determines a virtual image and an operation of the virtual image and displays the virtual image, according to some embodiments.

FIG. 16 is a flowchart of a method by which an HMD device 2000 determines a virtual image and an operation of the virtual image and displays the virtual image, according to some embodiments.

In operation S1600, the HMD device 2000 captures an object of a real space by using a camera provided in the HMD device 2000. The HMD device 2000 may capture an object of a real space in real time or at a preset period.

In operation S1610, the HMD device 2000 determines a virtual image to be displayed around the captured object. The HMD device 2000 may determine the virtual image to be displayed around the captured object, based on a user input for the HMD device 2000. In this case, the HMD device 2000 may display a user interface for selecting a virtual image on a screen of the HMD device 2000, and may select a particular virtual image based on a user input via the user interface.

In operation S1620, the HMD device 2000 determines the operation of the virtual image based on the position at which the virtual image is to be displayed and the type of the object. The HMD device 2000 may determine where the virtual image is to be displayed around the object, and may determine how to make the virtual image move according to the type of the object. For example, when the virtual image is a dog image and the dog image is determined to be displayed on a sofa, the HMD device 2000 may confirm that the object is the sofa and the dog image is to be displayed on the sofa. Also, the HMD device 2000 may determine to display an image of a dog lying down on the sofa.

Also, the HMD device 1000 may calculate a coordinate value of a position at which the virtual image is to be displayed on the screen of the HMD device 2000, according to relative positions of a user's eyes, the screen of the HMD device 2000, and the object of the real space. For example, when the HMD device 2000 determines to display the image of the dog lying down on the sofa, the HMD device 2000 may calculate coordinate values of a position of the "dog image" as the virtual image and a position indicating "on the sofa". Also, in this case, the coordinate value of the position indicating "on the sofa" may be a coordinate value indicating the position on the screen of the HMD device 2000, and may be calculated by the HMD device 2000 according to the relative positions of the user's eyes, the screen of the HMD device 2000, and the sofa of the real space.

In operation S1630, the HMD device 2000 changes the operation of the displayed virtual image. The HMD device 2000 may move a character of the virtual image according to the determined operation by changing the virtual image according to the predetermined operation.

Figure 17:
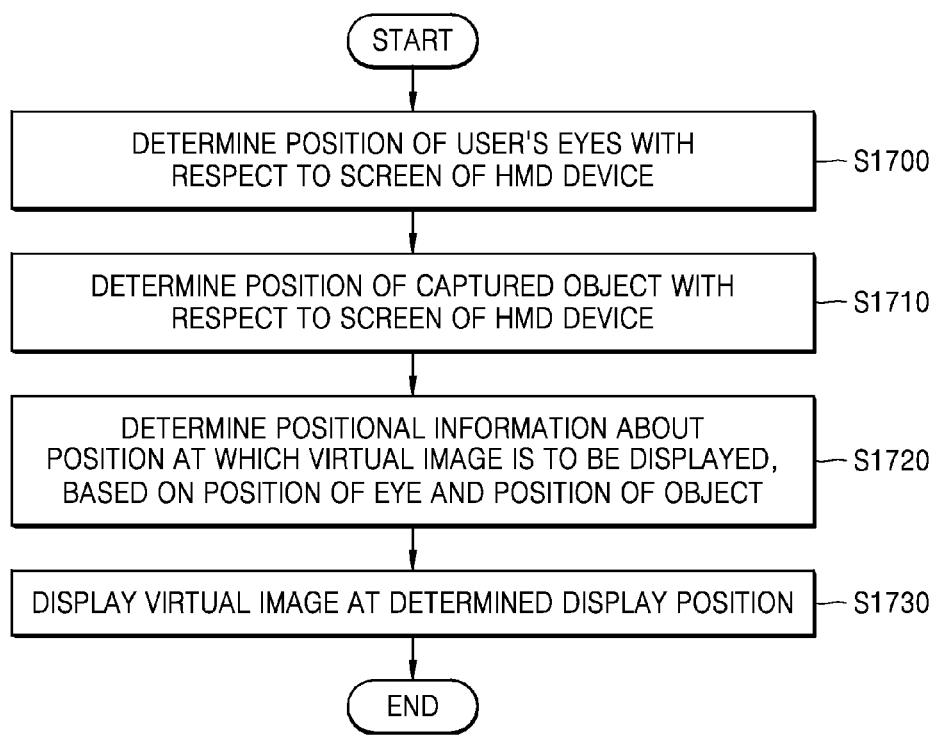
FIG. 17 is a flowchart of a method by which an HMD device determines a position at which a virtual image is to be displayed, according to some embodiments.

FIG. 17 is a flowchart of a method by which an HMD device 2000 determines a position at which a virtual image is to be displayed, according to some embodiments.

In operation S1700, the HMD device 2000 determines a position of a user's eye with respect to a screen of the HMD device 2000. The HMD device 2000 may capture a user's eye and determine a position of the user's eye with respect to the HMD device 2000 by using the captured eye image. Also, the position of the eye with respect to the screen of the HMD device 2000 may be a position indicating where the eye is from the screen of the HMD device 2000. Also, for example, the position of the eye with respect to the screen of the HMD device 2000 may be specified by a direction in which the eye is present from the screen of the HMD device 2000 and a distance from the HMD device 2000 to the eye. However, embodiments of the present disclosure are not limited thereto.

Also, the HMD device 1000 may determine the position of the eye with respect to the screen of the HMD device 2000 by using product information of the HMD device 2000 and the eye image. The product information of the HMD device 2000 may include, for example, information about a portion of the HMD device 2000 at which the camera capturing the eye image is mounted, the capturing direction of the camera, information about the capturing condition of the camera, and information about the position of the screen in the HMD device 2000 and the screen size of the HMD device 2000, but embodiments of the present disclosure are not limited thereto.

In operation S1710, the HMD device 2000 determines a position of an object with respect to the screen of the HMD device 2000. The position of the object with respect to the screen of the HMD device 2000 may be a position at which the object is placed from the screen of the HMD device 2000. Also, for example, the position of the object with respect to the screen of the HMD device 2000 may be specified by a direction in which the object is placed from the screen of the HMD device 2000 and a distance from the HMD device 2000 to the object. However, embodiments of the present disclosure are not limited thereto. Also, the HMD device 2000 may determine the position of the object with respect to the screen of the HMD device 2000 by using the product information of the HMD device 2000 and the object image.

Also, the HMD device 2000 may determine where the virtual image is to be displayed around the object, based on a user input for the HMD device 2000. Also, the value indicating the position determined by the HMD device 2000 may be a value indicating a position around the object, such as "on the sofa" or "next to the sofa". Also, in operation S1720, the HMD device 2000 may generate a coordinate value of the position at which the virtual image is to be displayed on the screen of the HMD device 2000, based on the position of the eye and the position of the object. In this case, the HMD device 2000 may calculate a coordinate value indicating a position of a region in which the object is viewed by the user in an entire region of the screen when the user views the object.

Also, the HMD device 2000 may determine the display size of the virtual image based on the size of the region in which the object is viewed by the user in the entire region of the screen when the user views the object.

In operation S1730, the HMD device 2000 displays the virtual image on the screen of the HMD device 2000 based on the generated positional information. The HMD device 2000 may display the virtual image at a particular position of the HMD device 2000 in a particular size by using the generated positional information and the determined display size.

Figure 18:
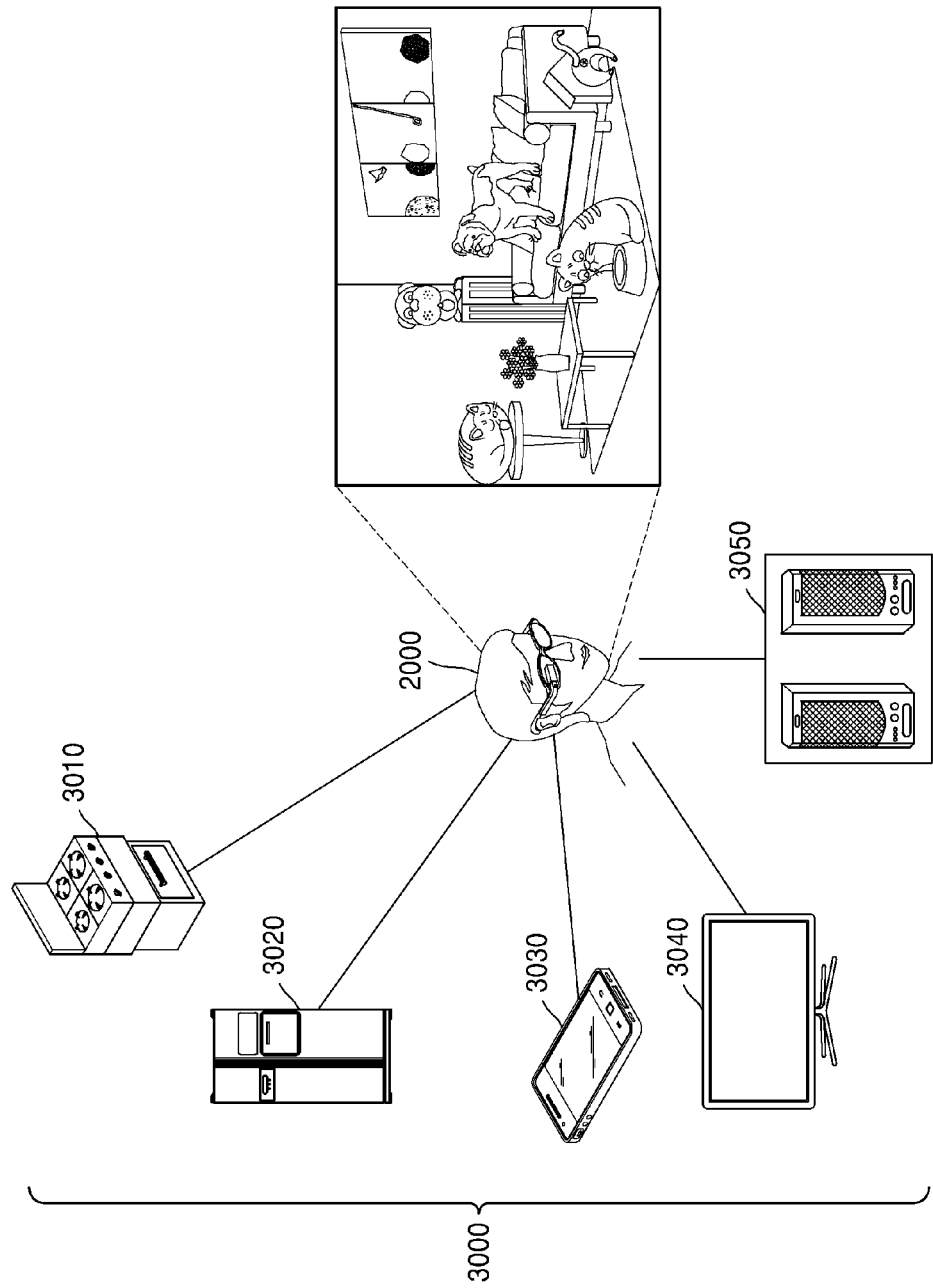
FIG. 18 is a diagram illustrating a system that allows an HMD device to interwork with a peripheral device and display a virtual image, without the aid of a device, according to some embodiments.

FIG. 18 is a diagram illustrating a system that allows an HMD device 2000 to interwork with a peripheral device 3000 and display a virtual image, without the aid of a device 1000, according to some embodiments.

Referring to FIG. 18, the HMD device 2000 may identify at least one peripheral device 3000 around the HMD device 1000, interwork with the peripheral device 3000, and display a virtual image. Also, the HMD device 2000 may execute the functions of the HMD device 2000 and the device 1000 described with reference to FIGS. 9 to 14.

Figure 19:
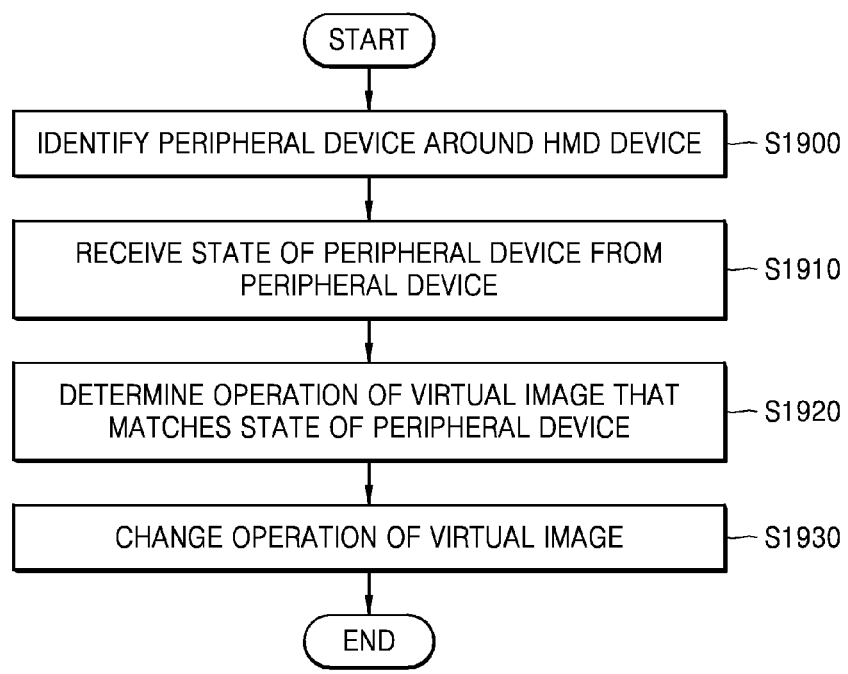
FIG. 19 is a flowchart of a method by which an HMD device changes an operation of a virtual image displayed on a screen of the HMD device according to a state of a peripheral device, according to some embodiments.

FIG. 19 is a flowchart of a method by which an HMD device 2000 changes an operation of a virtual image displayed on a screen of the HMD device 2000 according to a state of a peripheral device 3000, according to some embodiments.

In operation S1900, the HMD device 2000 identifies the peripheral device 3000. The HMD device 2000 may identify the peripheral device 3000 that can communicate with the HMD device 2000. For example, when the HMD device 2000 is located in the home, the HMD device 2000 may identify home appliances that can be connected to the HMD device 2000.

In operation S1910, the HMD device 2000 receives state information of the peripheral device 3000 from the peripheral device 3000. The state information of the peripheral device 3000 may be information indicating a state associated with the operation of the peripheral device 3000. For example, the state information of the peripheral device 3000 may include information indicating whether the power of the peripheral device 3000 is turned on or off, information indicating the operation that is being executed by the peripheral device 3000, and information indicating whether the operation executed by the peripheral device 3000 is finished. However, embodiments of the present disclosure are not limited thereto.

In operation S1920, the HMD device 2000 determines an operation of a virtual image that matches the state of the peripheral device 3000. The HMD device 2000 may determine the operation of the virtual image that matches the state of the peripheral device 3000, based on the state information received from the peripheral device 3000. In this case, the operation of the virtual image that matches the state of the peripheral device 3000 may be previously set. For example, when the peripheral device 3000 is a refrigerator, the device 1000 may receive state information indicating that a door of the refrigerator has been opened for more than a preset time.

Also, the device 1000 may determine the operation of the virtual image so as to notify that the door of the refrigerator is opened.

In operation S1930, the HMD device 2000 changes the operation of the virtual image being displayed, according to the determined operation.

Figure 20:
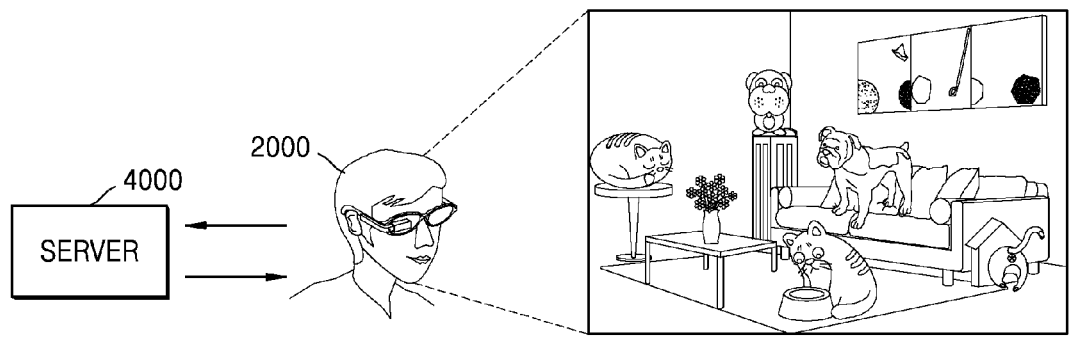
FIG. 20 is a diagram illustrating a system that allows an HMD device to interwork with a server to display a virtual image on a screen of the HMD device, according to some embodiments.

FIG. 20 is a diagram illustrating a system that allows an HMD device 2000 to interwork with a server 4000 to display a virtual image on a screen of the HMD device 2000, according to some embodiments.

Referring to FIG. 20, the HMD device 2000 may be communicatively connected to the server 4000, and the HMD device 2000 may display a virtual image around an object of a real space and change an operation of the displayed virtual image. Also, in this case, the server 4000 may execute the functions of the device 1000 described with reference to FIGS. 1 to 14.

Figure 21:
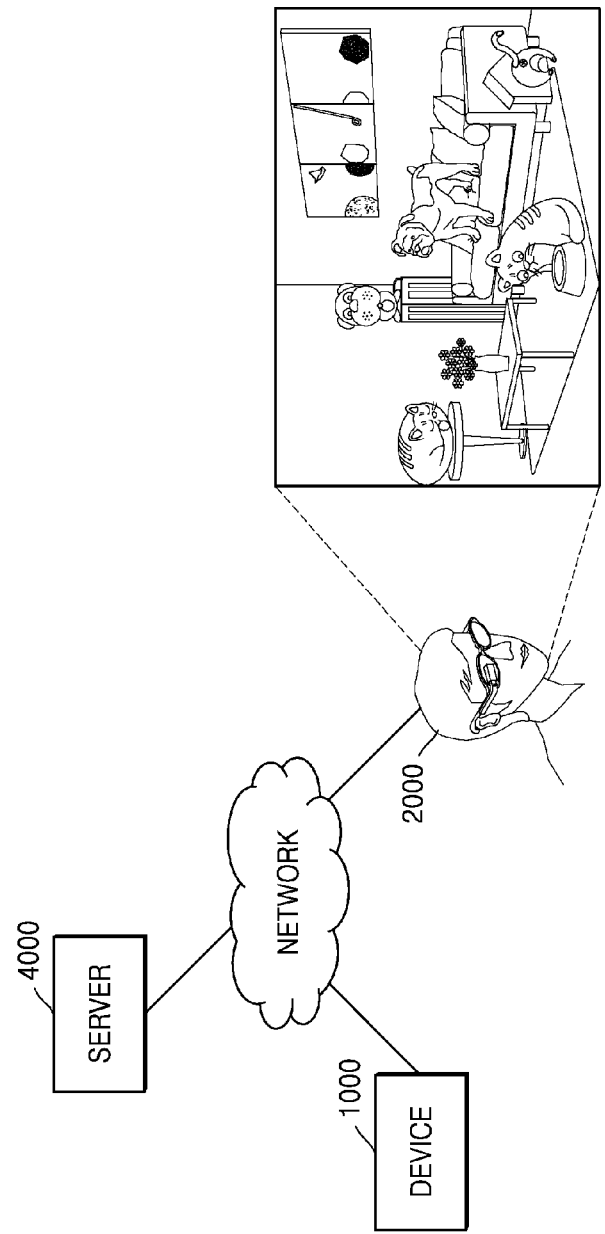
FIG. 21 is a diagram illustrating a system that allows an HMD device to interwork with a device and a server to display a virtual image on a screen of the HMD device, according to some embodiments.

FIG. 21 is a diagram illustrating a system that allows an HMD device 2000 to interwork with a device 1000 and a server 4000 to display a virtual image on a screen of the HMD device 2000, according to some embodiments.

Referring to FIG. 21, the HMD device 2000 may be communicatively connected to the device 1000 and the server 4000, and the HMD device 2000 may display a virtual image around an object of a real space and change an operation of the displayed virtual image. Also, the device 1000 and the server 4000 in FIG. 23 may separately execute the functions of the device 1000 described with reference to FIGS. 1 to 14.

Figure 22:
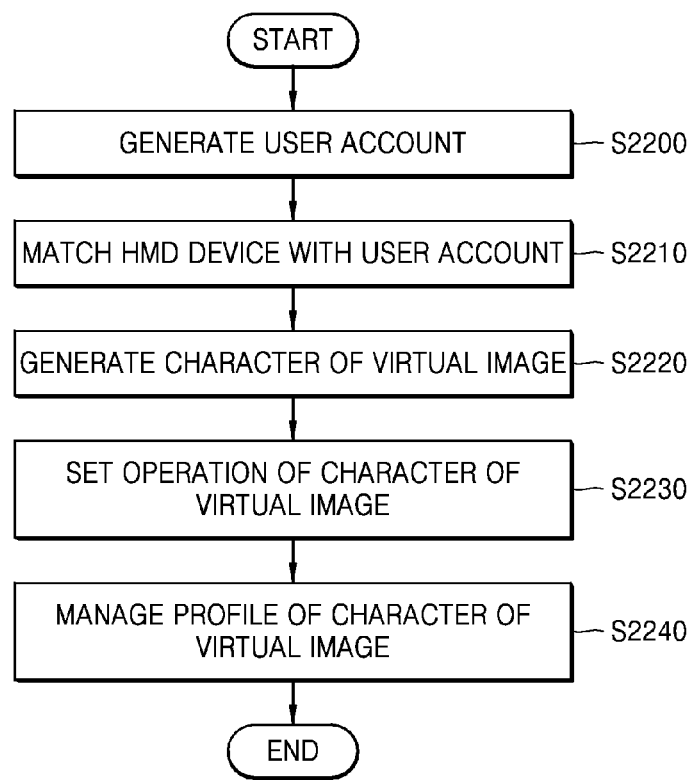
FIG. 22 is a flowchart of a method by which a server sets and manages a user account and a character of a virtual image, according to some embodiments.

FIG. 22 is a flowchart of a method by which a server 4000 sets and manages a user account and a character of a virtual image, according to some embodiments.

In operation S2200, the server 4000 generates a user account. The server 4000 may generate the user account by receiving a user input of inputting a user's ID and password from the HMD device 2000 or the device 1000.

In operation S2210, the server 4000 matches the HMD device 2000 with the generated user account. The server 4000 may match the user account with the HMD device 2000 of the user. Accordingly, setting information about the operation of the virtual image and the character of the virtual image registered in the user account may match the HMD device 2000. Also, the server 4000 may display the virtual image of the predetermined operation through the HMD device 2000 matching the user account, based on the setting information about the operation of the virtual image and the character of the virtual image registered in the user account.

In operation S2220, the server 4000 generates the character of the virtual image. The server 4000 may provide a list of characters of the virtual image to the device 1000 or the HMD device 2000. Also, the server 4000 may register the character of the virtual image in the user account, based on a user's selection input for the list of characters, which is received from the device 1000 or the HMD device 2000. Also, the server 4000 may provide a user interface for editing the character of the virtual image to the device 1000 or the HMD device 2000. Accordingly, the device 1000 or the HMD device 2000 may display the user interface, and the server 4000 may receive the user input via the displayed user interface from the device 1000 or the HMD device 2000 and generate the character of the virtual image based on the received user input. The character of the virtual image may include, for example, an animal character, a character of an animated movie, and the like, but embodiments of the present disclosure are not limited thereto.

In operation S2230, the server 4000 sets the operation of the virtual image. The server 4000 may set the operation of the virtual image corresponding to the operation mode, the object, the position with respect to the object, and the user input, based on the user input received from the device 1000 or the HMD device 2000.

In operation S2240, the server 4000 manages a profile of the character of the virtual image. Profile information about a name and an operation of the virtual image may be stored while matching the user account, and may be edited and updated by the user input received from the device 1000 or the HMD device 2000. Also, the server 4000 may accumulatively store history information about the operation of the character of the virtual image. Also, the user may purchase an item for decorating the character of the virtual image from the server 4000, and the server 4000 may store the item purchased by the user while matching the character of the virtual image.

The server 4000 that sets and manages the user account and the character of the virtual image has been described with reference to FIG. 22, but embodiments of the present disclosure are not limited thereto. The device 1000 may set and manage the user account and the character of the virtual image.

Figure 23:
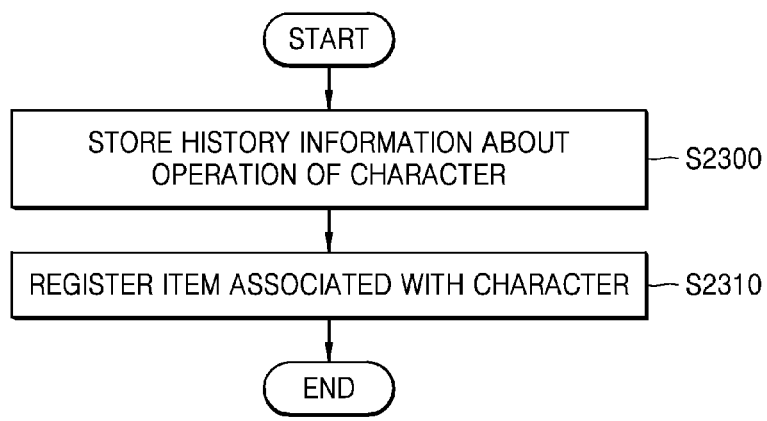
FIG. 23 is a flowchart of a method by which a server manages a profile of a character, according to some embodiments.

FIG. 23 is a flowchart of a method by which a server 4000 manages a profile of a character, according to some embodiments.

In operation S2300, the server 4000 stores history information about the operation of the character of the virtual image. The server 4000 may store the history associated with the operation of the virtual image displayed by changing according to the operation mode, the object, the position with respect to the object, and the user input. Also, the server 4000 may analyze the user's preference for the character of the virtual image and the operation of the character, based on the stored history information. Also, the server 4000 may recommend the character of the virtual image and the operation of the character to the device 1000 or the HMD device 2000, based on the use's preference.

In operation S2310, the server 4000 registers an item associated with the character. The user may purchase an item for decorating the character of the virtual image, and the server 4000 may register the item purchased by the user in the user account. Accordingly, the item purchased by the user may be stored while matching the character of the virtual image.

The server 4000 that manages the profile of the character has been described with reference to FIG. 23, but embodiments of the present disclosure are not limited thereto. The device 1000 may manage the profile of the character.

Figure 24:
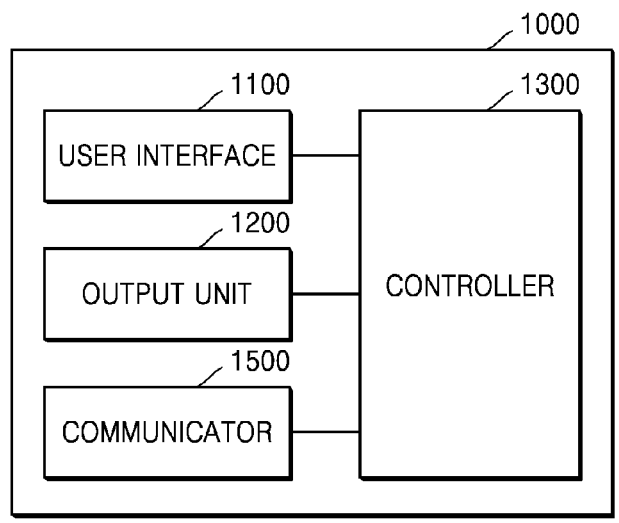
FIGS. 24 and 25 are block diagrams of a device according to some embodiments.
Figure 25:
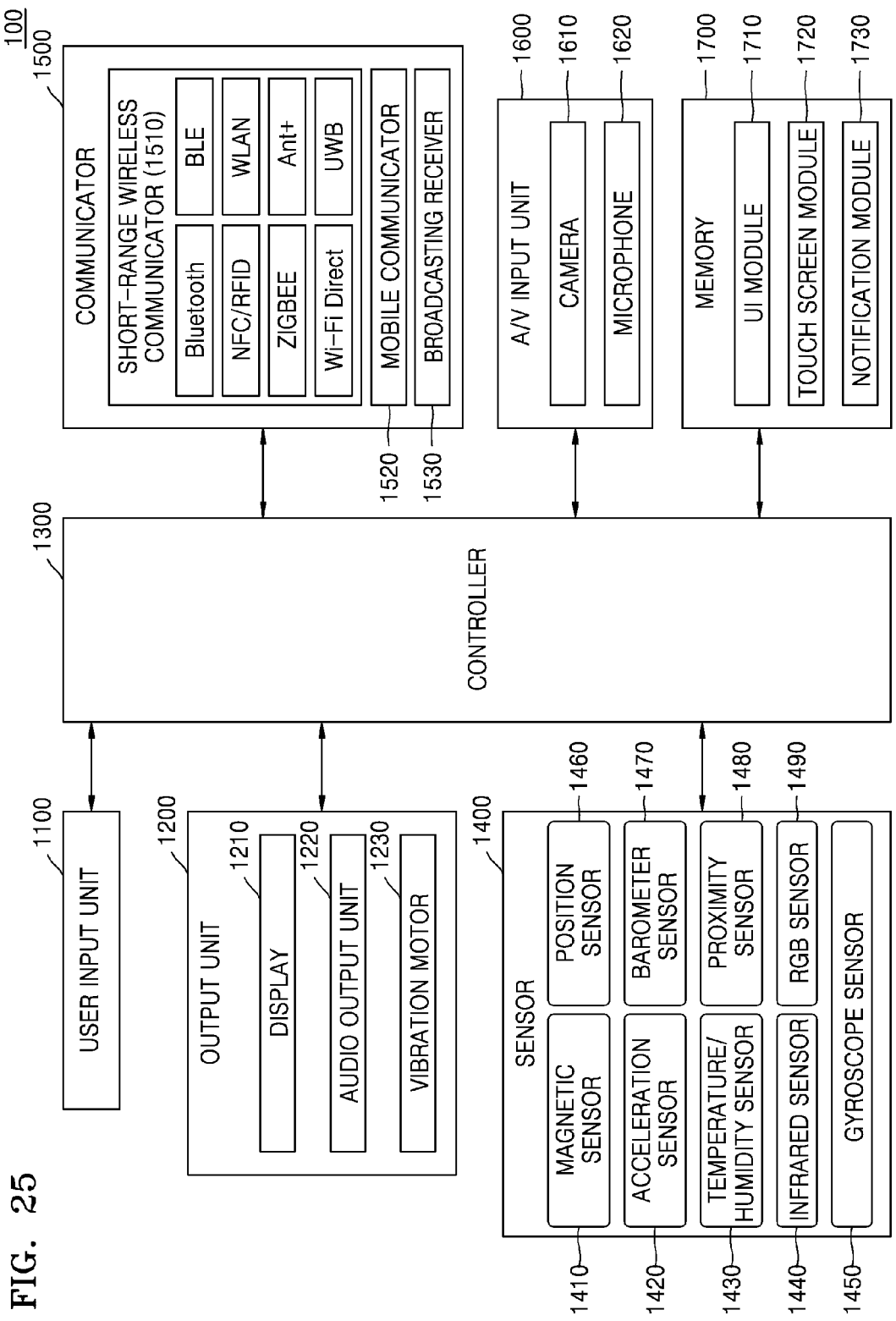

FIGS. 24 and 25 are block diagrams of a device 1000 according to some embodiments.

As illustrated in FIG. 24, the device 1000 according to some embodiments may include a user input unit 1100, an output unit 1200, a controller 1300, and a communicator 1500. However, all elements illustrated in FIG. 24 are not essential to the device 1000. The device 1000 may be implemented with a larger number of elements than illustrated in FIG. 24, or may be implemented with a smaller number of elements than illustrated in FIG. 24.

For example, as illustrated in FIG. 25, the device 1000 according to some embodiments may further include a sensor 1400, an audio/video (A/V) input unit 1600, and a memory 1700, in addition to the user input unit 1100, the output unit 1200, the controller 1300, and the communicator 1500.

The user input unit 1100 is a unit that allows a user to input data for controlling the device 1000. For example, the user input unit 1100 may include a key pad, a dome switch, a touch pad (a touch-type capacitive touch pad, a pressure-type resistive touch pad, an infrared beam sensing type touch pad, a surface acoustic wave type touch pad, an integral strain gauge type touch pad, a piezo effect type touch pad, or the like), a jog wheel, and a jog switch, but embodiments of the present disclosure are not limited thereto.

The user input unit 1100 may receive a user input of selecting a virtual image to be displayed. Also, the user input unit 1100 may receive a user input for setting the operation of the virtual image and a user input for purchasing an item associated with the virtual image.

The output unit 1200 may output an audio signal, a video signal, or a vibration signal. The output unit 1200 may include a display 1210, an audio output unit 1220, and a vibration motor 1230.

The display 1210 displays information processed by the device 1000. For example, the display 1210 may display a user interface for selecting the virtual image, a user interface for setting the operation of the virtual image, and a user interface for purchasing the item of the virtual image.

On the other hand, in a case where the display 1210 and a touch pad form a layered structure to constitute a touch screen, the display 1210 may also be used as an input device as well as an output unit. The display 1210 may include at least one selected from among a liquid crystal display (LCD), a thin film transistor-liquid crystal display (TFT-LCD), an organic light-emitting diode (OLED), a flexible display, a three-dimensional (3D) display, and an electrophoretic display. According to implementations of the device 1000, the device 1000 may include two or more displays 1210. The two or more displays 1210 may be disposed to face each other by using a hinge.

The audio output unit 1220 may output audio data received from the communicator 1500 or audio data stored in the memory 1700. Also, the audio output unit 1220 outputs an audio signal associated with the function performed by the device 1000 (for example, a call signal reception sound, a message reception sound, and a notification sound). The audio output unit 1220 may include a speaker, a buzzer, or the like.

The vibration motor 1230 may output a vibration signal. For example, the vibration motor 1230 may output a vibration signal corresponding to an output of audio data or video data (for example, a call signal reception sound, a message reception sound, or the like). Also, the vibration motor 1230 may output a vibration signal when a touch screen is touched.

The controller 1300 controls an overall operation of the device 1000. For example, the controller 1300 may control the user input unit 1100, the output unit 1200, the sensor 1400, the communicator 1500, and the A/V input unit 1600 by executing programs stored in the memory 1700.

Specifically, the controller 1300 may control the communicator 1500 to receive, from the HMD device 2000, the object image captured by the HMD device 2000, and determine a virtual image to be displayed around the captured object. The controller 1300 may determine the virtual image to be displayed around the captured object, based on a user input via the user input unit 1100. In this case, the controller 1300 may display a user interface for selecting a virtual image on a screen of the device 1000, and may select a particular virtual image based on a user input via the user interface. Also, the controller 1300 may receive, from the HMD device 2000, an identification value of the virtual image selected by the HMD device 2000.

Also, the controller 1300 determines the operation of the virtual image based on the position at which the virtual image is to be displayed and the type of the object. The controller 1300 may determine where the virtual image is to be displayed around the object, and may determine how to make the virtual image move according to the type of the object. For example, when the virtual image is a dog image and the dog image is determined to be displayed on a sofa, the controller 1300 may confirm that the object is the sofa and the dog image is to be displayed on the sofa. Also, the controller 1300 may determine to display an image of a dog lying down on the sofa.

Also, the controller 1300 may provide the virtual image, positional information about the position at which the virtual image is to be displayed, and operation information about the determined operation to the HMD device 2000. In this case, the controller 1300 may calculate a coordinate value of a position at which the virtual image is to be displayed on the screen of the HMD device 2000, according to relative positions of a user's eyes, the screen of the HMD device 2000, and the object of the real space.

For example, when the controller 1300 determines to display the image of the dog lying down on the sofa, the controller 1300 may provide the "dog image" as the virtual image, positional information indicating "on the sofa", and operation information indicating "lying down" to the HMD device 2000. Also, in this case, the positional information indicating "on the sofa" may be a coordinate value indicating the position on the screen of the HMD device 2000, and may be calculated by the controller 1300 according to the relative positions of the user's eyes, the screen of the HMD device 2000, and the sofa of the real space.

On the other hand, the controller 1300 may determine or change the operation of the virtual image.

Specifically, the controller 1300 determines an operation mode of the virtual image. The operation mode is a mode set for the virtual image to perform a predetermined operation in a predetermined situation and may include, for example, a normal mode and a play mode. Also, the controller 1300 may determine the operation mode based on a user input via the user input unit 1100. However, embodiments of the present disclosure are not limited thereto. The HMD device 2000 may determine the operation mode based on a user input for the HMD device 2000, and the controller 1300 may receive information about the operation mode determined by the HMD device 2000.

Also, the controller 1300 identifies an object from an object image received from the HMD device 2000. The controller 1300 may identify what the object is from the object image. For example, the controller 1300 may identify a kind, a name, and the like of the object, but embodiments of the present disclosure are not limited thereto.

Also, the controller 1300 determines a position of the virtual image with respect to the object. The controller 1300 may determine where the virtual image is to be displayed around the object, based on a user input via the user input unit 1100.

Also, the controller 1300 receives a user input for changing the operation of the virtual image. The user input may be, for example, a touch input, a button input, and a voice input, but embodiments of the present disclosure are not limited thereto. Also, the controller 1300 may receive the user input for the HMD device 2000 from the HMD device 2000.

Also, the controller 1300 determines the operation of the virtual image corresponding to the operation mode, the object, the position of the virtual image with respect to the object, and the user input. For example, the controller 1300 may determine the operation of the object as "growling" when the operation mode is a normal mode, the virtual image is a "dog image", the object is a "rice bowl", the position of the virtual image with respect to the object is "next to", and the user input is a "gesture of waving up and down".

On the other hand, the controller 1300 may change the operation of the virtual image displayed through the HMD device 2000 according to the state of the peripheral device 3000 around the device 1000.

Specifically, the controller 1300 may identify the peripheral device 3000. The controller 1300 may identify the peripheral device 3000 that can communicate with the device 1000. For example, when the device 1000 is located in the home, the controller 1300 may identify home appliances that can be connected to the device 1000. For example, the controller 1300 may identify a refrigerator, an oven, a TV, an audio component, and the like, but embodiments of the present disclosure are not limited thereto.

Also, the controller 1300 receives state information of the peripheral device 3000 from the peripheral device 3000. The state information of the peripheral device 3000 may be information indicating a state associated with the operation of the peripheral device 3000. For example, the state information of the peripheral device 3000 may include information indicating whether the power of the peripheral device 3000 is turned on or off, information indicating the operation that is being executed by the peripheral device 3000, and information indicating whether the operation executed by the peripheral device 3000 is finished. However, embodiments of the present disclosure are not limited thereto.

Also, the controller 1300 determines an operation of a virtual image that matches the state of the peripheral device 3000. The controller 1300 may determine the operation of the virtual image that matches the state of the peripheral device 3000, based on the state information received from the peripheral device 3000. In this case, the operation of the virtual image that matches the state of the peripheral device 3000 may be previously set. For example, when the peripheral device 3000 is a refrigerator, the controller 1300 may receive state information indicating that a door of the refrigerator has been opened for more than a preset time. Also, the controller 1300 may determine the operation of the virtual image so as to notify that the door of the refrigerator is opened.

Also, the controller 1300 provides operation change information about an operation change of the virtual image to the HMD device 2000. The controller 1300 may provide the operation change information about the operation of the virtual image to the HMD device 2000, and accordingly, the HMD device 2000 may change the operation of the virtual image that is being displayed.

The sensor 1400 may detect a state of the device 1000 or a state around the device 1000 and transfer the detected information to the controller 1300.

The sensor 1400 may include at least one selected from among a magnetic sensor 1410, an acceleration sensor 1420, a temperature/humidity sensor 1430, an infrared sensor 1440, a gyroscope sensor 1450, a position sensor (e.g., global positioning system (GPS)) 1460, a barometer sensor 1470, a proximity sensor 1480, and an RGB sensor (illuminance sensor) 1490, but embodiments of the present disclosure are not limited thereto. Since the functions of the respective sensors may be intuitively inferred from their names, detailed descriptions thereof will be omitted.

The communicator 1500 may include one or more elements for communication between the device 1000 and the HMD device 2000 or communication between the device 1000 and the server 4000. For example, the communicator

1500 may include a short-range wireless communicator 1510, a mobile communicator 1520, and a broadcasting receiver 1530.

The short-range wireless communicator 151 may include a Bluetooth communicator, a Bluetooth low energy (BLE) communicator, a near field communicator, a wireless local access network (WLAN) (Wi-Fi) communicator, a Zigbee communicator, an infrared data association (IrDA) communicator, a Wi-Fi direction (WFD) communicator, an ultra wideband (UWB) communicator, or an Ant+ communicator, but embodiments of the present disclosure are not limited thereto.

The mobile communicator 1520 may transmit and receive a wireless signal with at least one selected from among a base station, an external terminal, and a server via a mobile communication network. The wireless signal may include a voice call signal, a video call signal, or various types of data according to text or multimedia message transmission and reception.

The broadcasting receiver 1530 may receive broadcasting signals and/or broadcasting-related information from the outside via a broadcasting channel. The broadcasting channel may include a satellite channel and a terrestrial channel. According to various embodiments, the device 1000 may not include the broadcasting receiver 1530.

Also, the communicator 1500 may transmit and receive information necessary for displaying the virtual image through the HMD device 2000 and changing the operation of the virtual image to and from the HMD device 2000, the server 4000, and the peripheral device 3000.

The A/V input unit 1600 may receive audio or video signals and may include a camera 1610 and a microphone 1620. The camera 1610 may obtain an image frame, such as a still image or a moving image, through an image sensor in a video phone mode or a capturing mode. An image captured through the image sensor may be processed through the controller 1300 or a separate image processor (not illustrated).

The image frame processed by the camera 1610 may be stored in the memory 1700 or may be transmitted to the outside through the communicator 1500. The camera 1610 may include two or more cameras according to the configuration of the terminal.

The microphone 1620 may receive external audio signals and process the external audio signals into electrical voice data. For example, the microphone 1620 may receive audio signals from an external device or a person who speaks. The microphone 1620 may use various noise removal algorithms for removing noise generated in the process of receiving external audio signals.

The memory 1700 may store a program for processing and control of the controller 1300, and may store data input from the device 1000 or data output from the device 1000.

The memory 1700 may include at least one storage medium selected from among a flash memory, a hard disk, a multimedia card micro type memory, a card type memory (e.g., SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disk.

The programs stored in the memory 1700 may be classified into a plurality of modules according to functions thereof. For example, the programs may be classified into a user interface (UI) module 1710, a touch screen module 1720, and a notification module 1730.

The UI module 1710 may provide a specialized UI or GUI that interworks with the device 1000 according to applications. The touch screen module 1720 may detect a user's touch gesture on a touch screen and transmit information about the touch gesture to the controller 1300. According to some embodiments, the touch screen module 1720 may recognize and analyze a touch code. The touch screen module 1720 may include separate hardware including a controller.

Various sensors may be provided inside or near the touch screen so as to detect a touch on the touch screen or hovering above the touch screen. An example of the sensor that detects the touch on the touch screen may be a tactile sensor. The tactile sensor may sense a contact of a specific object at or beyond a sensitivity of a person. The tactile sensor may sense a variety of information, such as roughness of a contact surface, hardness of a contact object, a temperature of a contact point, or the like.

Also, an example of the sensor that senses the touch on the touch screen may be a proximity sensor.

The proximity sensor may sense the presence or absence of an object approaching a certain detection surface or an object existing nearby by using a force of an electromagnetic field or infrared light, without any mechanical contact. Examples of the proximity sensor may include a transmission-type photoelectric sensor, a direct reflection-type photoelectric sensor, a mirror reflection-type photoelectric sensor, a radio frequency oscillation-type proximity sensor, an electrostatic capacitance-type proximity sensor, a magnetic-type proximity sensor, and an infrared proximity sensor. Touch gestures of the user may include a tap, a touch and hold, a double-tap, a drag, a panning, a flick, a drag-and-drop, a swipe, and the like.

The notification module 1730 may output a signal for notifying an event occurrence of the device 1000. Examples of events occurring in the device 1000 include a call signal reception, a message reception, a key signal input, and a schedule notification. The notification module 1730 may output a notification signal through the display 8351 in the form of a video signal. The notification module 1210 may output a notification signal through the audio output unit 8352 in the form of an audio signal. The notification module 1730 may output a notification signal through a vibration motor 1230 in the form of a vibration signal.

Figure 26:
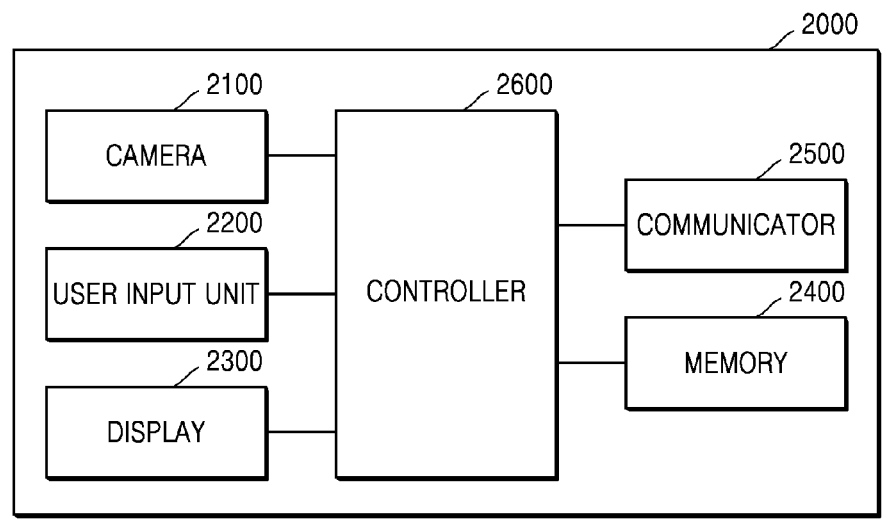
FIG. 26 is a block diagram of an HMD device according to some embodiments.

FIG. 26 is a block diagram of an HMD device 2000 according to some embodiments.

Referring to FIG. 26, the HMD device 2000 may include at least one camera 2100, a user input unit 2200, a display 2300, a communicator 2400, a memory 2500, and a controller 2600.

The camera 2100 captures an object of a real space. The HMD device 2000 may be, for example, glasses having a communication function and a data processing function, and the camera 2100 facing the user's front in the HMD device 2000 worn by a user may capture an object of a real space. Also, an object image captured by the camera 2100 may be a moving image or continuous still images.

Also, the camera 2100 captures a user's eyes. For example, the camera facing the user's face in the HMD device 2000 worn by the user may capture the user's eyes.

The user input unit 2200 receives a user input for controlling the HMD device 2000. The user input unit 1100 may receive a touch input and a key input for the HMD device 2000. Also, the user input unit 2200 may receive a user's gesture input captured by the camera 2100.

The display 2300 displays information processed by the HMD device 2000. The display 2300 may display a virtual image. Also, the display 2300 may display a user interface for selecting the virtual image, a user interface for setting the operation of the virtual image, and a user interface for purchasing the item of the virtual image.

The communicator 2400 may transmit and receive information necessary for the HMD device 2000 to display the virtual image and change the operation of the displayed virtual image to and from the device 1000, the peripheral device 3000, and the server 4000.

The memory 2500 may store information necessary for the HMD device 2000 to display the virtual image and change the operation of the displayed virtual image.

The controller 2600 controls an overall operation of the HMD device 2000. For example, the controller 2600 may control the camera 2100, the user input unit 2100, the display 2300, and the communicator 2400 by executing the programs stored in the memory 2400.

The HMD device 2000 may be connected to at least one of the device 1000 and the server 4000 and may receive information about the virtual image from at least one of the device 1000 and the server 4000 and display the virtual image on the screen of the HMD device 2000.

In this case, the controller 2600 may capture an image of the object of the real space and provide the captured object image to at least one of the device 1000 and the server 4000. Also, the controller 2600 may receive the virtual image, positional information about the position at which the virtual image is to be displayed, and operation information of the virtual image from at least one of the device 1000 and the server 4000. Also, the controller 2600 may display the virtual image at a position corresponding to the captured object on the screen of the HMD device 2000 and change the operation of the displayed virtual image.

Also, the controller 2600 may capture a user's eyes and provide the captured eye image to at least one of the device 1000 and the server 4000. Also, the controller 2600 may provide device information of the HMD device to at least one of the device 1000 and the server 4000.

On the other hand, the HMD device 2000 may display the virtual image on the screen of the HMD device 2000, without being connected to the device 1000 and the server 4000.

In this case, the controller 2600 captures the object of the real space by using the camera 2100. The controller 2600 may capture the object of the real space in real time or at a preset period.

Also, the device 2600 determines a virtual image to be displayed around the captured object. The controller 2600 may determine the virtual image to be displayed around the captured object, based on a user input via the user input unit 2200. In this case, the controller 2600 may display a user interface for selecting a virtual image on a screen of the HMD device 2000, and may select a particular virtual image based on a user input via the user interface.

Also, the controller 2600 determines the operation of the virtual image based on the position at which the virtual image is to be displayed and the type of the object. The controller 2600 may determine where the virtual image is to be displayed around the object, and may determine how to make the virtual image move according to the type of the object.

Also, the controller 2600 may calculate a coordinate value of a position at which the virtual image is to be displayed on the screen of the HMD device 2000, according to relative positions of a user's eyes, the screen of the HMD device 2000, and the object of the real space.

Also, the controller 2600 changes the operation of the virtual image to be displayed. The controller 2600 may move a character of the virtual image according to the determined operation by changing the virtual image according to the predetermined operation.

Figure 27:
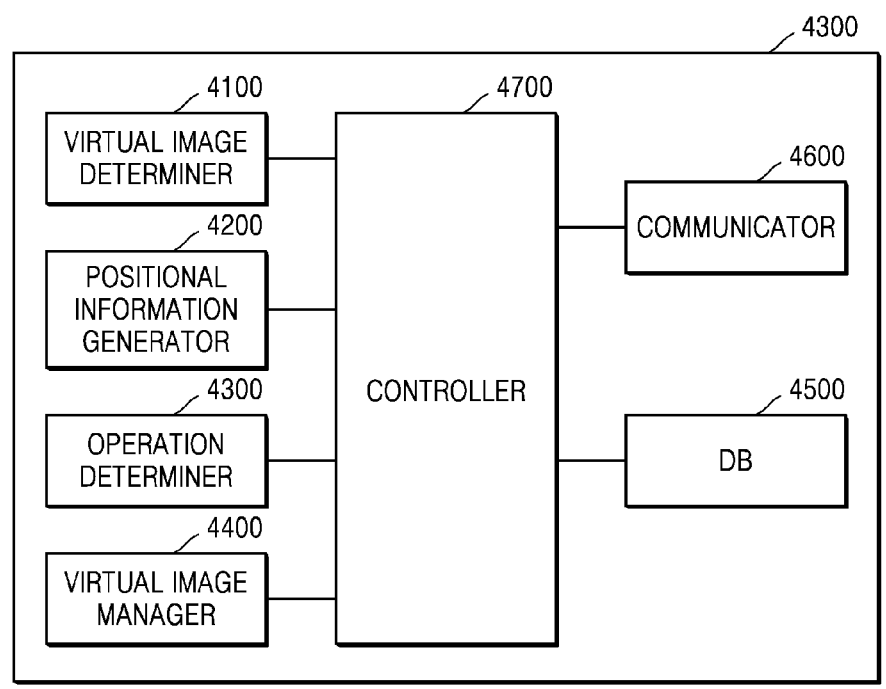
FIG. 27 is a block diagram of a server according to some embodiments.

FIG. 27 is a block diagram of a server 4000 according to some embodiments.

Referring to FIG. 27, the server 4000 according to some embodiments may include a virtual image determiner 4100, a positional information generator 4200, an operation determiner 4300, a virtual image manager 4400, a database (DB) 4500, a communicator 4600, and a controller 4700.

The virtual image determiner 4100 determines a virtual image to be displayed through the HMD device 2000. The virtual image determiner 4100 may determine the virtual image to be displayed around the captured object, based on an identification value of the virtual image received from the HMD device 2000 or the device 1000. In this case, the HMD device 2000 or the device 1000 may select the virtual image to be disposed around the object and provide the identification value of the selected virtual image to the server 4000. However, embodiments of the present disclosure are not limited thereto, and the virtual image determiner 4100 may determine the virtual image to be displayed around the object by using a predetermined set value and an object image.

The positional information generator 4200 determines a display position of the virtual image. The positional information generator 4200 may determine where the virtual image is to be displayed around the object by receiving a user input value of selecting the display position in the HMD device 2000 or the device 1000.

Also, the positional information generator 4200 generates positional information indicating the position at which the virtual image is to be displayed on the screen of the HMD device 2000. The positional information generator 4200 may generate a coordinate value indicating the position at which the virtual image is to be displayed on the screen of the HMD device 2000, based on the object image, the eye image, and the value indicating the determined position, which are received from the HMD device 2000. Also, the positional information generator 4200 may generate the coordinate value indicating the position at which the virtual image is to be displayed, based on the position of the eye with respect to the screen of the HMD device 2000 and the position of the object with respect to the screen of the HMD device 2000. In this case, the positional information generator 4200 may calculate a coordinate value indicating a position of a region in which the object is viewed by the user in an entire region of the screen when the user views the object.

Also, the positional information generator 4200 may determine the display size of the virtual image based on the size of the region in which the object is viewed by the user in the entire region of the screen when the user views the object.

The operation determiner 4300 determines an operation of the virtual image. The operation determiner 4300 determines an operation mode of the virtual image. The operation determiner 4300 may receive, from the HMD device 2000 or the device 1000, information about the operation mode determined by the HMD device 2000 or the device 1000.

Also, the operation determiner 4300 identifies an object from an object image received from the HMD device 2000. The device 1000 may identify what the object is from the object image. For example, the device 1000 may identify a kind, a name, and the like of the object, but embodiments of the present disclosure are not limited thereto.

Also, the operation determiner 4300 identifies a user input value for changing the operation of the virtual image. In this case, the device 1000 or the HMD device 2000 may provide a user input value for changing the operation of the virtual image to the server 4000. For example, the HMD device 2000 may receive a gesture input for the HMD device 2000 by capturing a user's gesture by using the camera provided in the HMD device 2000, and provide the received gesture input to the server 4000.

Also, the operation determiner 4300 determines the operation of the virtual image corresponding to the operation mode, the object, the position of the virtual image with respect to the object, and the user input.

The virtual image manager 4400 manages a user account and a character of the virtual image. The virtual image manager 4400 may generate the user account. The virtual image manager 4400 may generate the user account by receiving a user input of inputting a user's ID and password from the HMD device 2000 or the device 1000.

Also, the virtual image manager 4400 matches the HMD device 2000 with the generated user account. The virtual image manager 4400 may match the user account with the HMD device 2000 of the user. Accordingly, the character of the virtual image registered in the user account and setting information about the operation of the virtual image may matches the HMD device 2000.

Also, the virtual image manager 4400 generates the character of the virtual image. The server 4000 may provide a list of characters of the virtual image to the device 1000 or the HMD device 2000. Also, the virtual image manager 4400 may register the character of the virtual image in the user account, based on a user's selection input for the list of characters, which is received from the device 1000 or the HMD device 2000.

Also, the virtual image manager 4400 sets the operation of the virtual image. The virtual image manager 4400 may set the operation of the virtual image corresponding to the operation mode, the object, the position with respect to the object, and the user input, based on the user input received from the device 1000 or the HMD device 2000.

Also, the virtual image manager 4400 manages a profile of the character of the virtual image. Profile information about a name and an operation of the virtual image may be stored while matching the user account, and may be edited and updated by the user input received from the device 1000 or the HMD device 2000. Also, the virtual image manager 4400 may accumulatively store history information about the operation of the character of the virtual image. Also, the user may purchase an item for decorating the character of the virtual image, and the virtual image manager 4400 may store the item purchased by the user while matching the character of the virtual image.

The DB 4500 may store data necessary for the server 4000 to display the virtual image through the HMD device 2000 and manage the virtual image The communicator 4600 may transmit and receive, to and from the HMD device 2000 and the device 1000, data necessary for the server 4000 to display the virtual image through the HMD device 2000 and manage the virtual image.

The controller 4700 may control an overall operation of the server 4000. The controller 4700 may control the virtual image determiner 4100, the positional information generator 4200, the operation determiner 4300, the virtual image manager 4400, the DB 4500, and the communicator 4600, so that the server 4000 displays the virtual image through the HMD device 4100 and manages the virtual image.

All or part of the virtual image determiner 4100, the positional information generator 4200, the operation determiner 4300, the virtual image manager 4400, the communicator 4600, and the controller 4700 may be operated by a software module, but embodiments of the present disclosure are not limited thereto. Also, a part of the virtual image determiner 4100, the positional information generator 4200, the operation determiner 4300, the virtual image manager 4400, the communicator 4600, and the controller 4700 may be operated by hardware.

Also, at least a part of the virtual image determiner 4100, the positional information generator 4200, the operation determiner 4300, the virtual image manager 4400, and the communicator 4600 may be included in the controller 4700. The virtual image determiner 4100, the positional information generator 4200, the operation determiner 4300, the virtual image manager 4400, the communicator 4600, and the controller 4700 may be operated by one processor. However, embodiments of the present disclosure are not limited thereto.

Some embodiments may be embodied in the form of a recording medium including computer-executable instruction codes, such as a computer-executable program module. A non-transitory computer-readable medium may be any available non-transitory medium which is accessible by a computer and may include any removable or non-removable medium. Furthermore, the non-transitory computer-readable medium may include any computer storage medium. The computer storage medium may include any removable or non-removable medium embodied by a certain method or technology for storing information such as computer-readable instruction code, a data structure, a program module, or other data.

Also, the term "unit", "module", and the like used herein may be a hardware component such as a processor or a circuit, and/or a software component executed by a hardware component such as a processor.

It will be understood that embodiments described herein should be considered in a descriptive sense only and not for purposes of limitation. Descriptions of features or aspects within each embodiment should typically be considered as available for other similar features or aspects in other embodiments. For example, each element described as a singular form may be implemented in a distributed manner, and elements described as distributed may be implemented in an integrated manner.

While one or more embodiments have been described with reference to the drawings, it will be understood by those of ordinary skill in the art that various changes in form and details may be made thereto without departing from the spirit and scope as defined by the following claims.

The invention claimed is:

1. A method by which a head mounted display (HMD) device displays a virtual image, the method comprising:
    capturing an image of an eye of a user by using a camera;
    providing the image of the eye of the user to a device for determining a position of the eye of the user;
    receiving a user input for selecting an operation mode, wherein the operation mode is a mode set for the virtual image to perform a predetermined action in a predetermined situation;
    providing information regarding the operation mode selected by the user;
    receiving information on the virtual image related to an object viewed by the user and determined based on the position of the eye of the user from the device, wherein the information on the virtual image comprises information indicating an action performed by the virtual image determined based on the operation mode, and wherein the action performed by the virtual image comprises at least one of an animation of a virtual object and a sound associated with the virtual object;

displaying the virtual image on the HMD device based on the received information at a first display position in response to the position of the eye of the user being a first position relative to the HMD device, and displaying the virtual image based on the received information at a second display position in response to the position of the eye of the user being a second position different from the first position, relative to the HMD device; and displaying a changed virtual image in response to information about a changed state of a peripheral device connected to at least one of the HMD device or the device and the operation mode, wherein an action performed by the virtual image in a first operation mode is different from an action performed by the virtual image in a second operation mode, and wherein a plurality of actions performed by the virtual image are respectively matched with a plurality of states of the peripheral device, and an action performed by the changed virtual image is selected from among the plurality of the actions performed by the virtual image.

2. The method of claim 1, further comprising capturing an image of the object in a real space by using the camera; and providing the image of the object in the real space to the device.

3. The method of claim 2, wherein a display position of the virtual image is determined based on the position of the eye of the user and a position of the object.

4. The method of claim 2, wherein the position of the eye of the user is determined based on at least one of the image of the eye of the user, the image of the object in the real space, information about a portion of the HMD device at which the camera capturing the image of the eye of the user is mounted, information about a capturing direction of the camera, information about a capturing condition of the camera, information about a position of a screen in the HMD device or a screen size of the HMD device.

5. The method of claim 1, wherein the information on the virtual image comprises position information indicating a display position at which the virtual image is to be displayed, and wherein displaying of the virtual image further comprises displaying the virtual image corresponding to a predetermined action at a predetermined display position based on the information on the virtual image.

6. The method of claim 5, wherein the action performed by the virtual image is determined based on a type of the object.

7. The method of claim 1, wherein the information about the changed state of the peripheral device is provided to the device connected to the HMD device.

8. The method of claim 1, further comprising:
providing a gesture information about a gesture of the user to the device; and
receiving operation information about a changed action performed by the virtual image based on the gesture information from the device.

9. A method by which a device displays a virtual image through a head mounted display (HMD) device, the method comprising:

receiving an image of an eye of a user from the HMD device;

receiving information regarding an operation mode selected by the user from the HMD device, wherein the operation mode is a mode set for the virtual image to perform a predetermined action in a predetermined situation;

determining a position of the eye of the user based on the image of the eye of the user;

determining an object that is viewed by the user based on the determined position;

determining an action performed by the virtual image based on the operation mode;

providing information on the virtual image related to the object, wherein the information on the virtual image related to the object comprises a display position of the virtual image and operation information indicating an action performed by the virtual image determined based on an operation mode of the virtual image selected by an interaction of the user with the HMD device, the display position of the virtual image comprises a first display position in response to the position of the eye of the user being a first position, and the display position of the virtual image comprises a second display position different from the first display position in response to the position of the eye of the user being a second position;

receiving information about a changed state of a peripheral device connected to at least one of the HMD device or the device;

changing the action performed by the virtual image in response to the received information about the changed state and the operation mode; and providing information regarding the changed action performed by the virtual image to the HMD device, wherein the action performed by the virtual image comprises at least one of an animation of a virtual object or a sound associated with the virtual object, and the action performed by the virtual image in a first operation mode is different from an action performed by the virtual image in a second operation mode, and wherein a plurality of actions performed by the virtual image are respectively matched with a plurality of states of the peripheral device, and the changed action performed by the virtual image is selected from among the plurality of the actions performed by the virtual image.

10. A head mounted display (HMD) device for displaying a virtual image, the HMD device comprising:
a communicator; and
a controller configured to:
capture an image of an eye of a user by using a camera,
provide the image of the eye of the user to a device for determining a position of the eye of the user,
receive a user input for selecting an operation mode, wherein the operation mode is a mode set for the virtual image to perform a predetermined action in a predetermined situation, provide information regarding the operation mode selected by the user,
receive information on the virtual image related to an object viewed by the user and determined based on the position of the eye of the user from the device, wherein the information on the virtual image comprises information indicating an action performed by the virtual image determined based on the operation mode, and wherein the action performed by the virtual image comprises at least one of an animation of a virtual object and a sound associated with the virtual object, and display the virtual image on the HMD device based on the received information at a first display position in response to the position of the eye of the user being a first position relative to the HMD device, and display the virtual image based on the received information at a second display position in response to the position of the eye of the user being a second position different from the first position, relative to the HMD device, and display a changed virtual image in response to information about a changed state of a peripheral device connected to at least one of the HMD device or the device and the operation mode, wherein an action performed by the virtual image in a first operation mode is different from an action performed by the virtual image in a second operation mode, and wherein a plurality of actions performed by the virtual image are respectively matched with a plurality of states of the peripheral device, and an action performed by the changed virtual image is selected from among the plurality of the actions performed by the virtual image.

11. The device of claim 10, wherein the controller is further configured to capture an image of the object in a real space by using the camera, and provide the image of the object in the real space to the device.

12. The device of claim 11, wherein the display position of the virtual image is determined based on the position of the eye of the user and a position of the object.

13. The device of claim 11, wherein the position of the eye of the user is determined based on at least one of the image of the eye of the user, the image of the object in the real space, information about a portion of the HMD device at which the camera capturing the image of the eye of the user is mounted, information about a capturing direction of the camera, information about a capturing condition of the camera, information about a position of a screen in the HMD device or a screen size of the HMD device.

14. The device of claim 10, wherein the information on the virtual image comprises position information indicating the display position at which the virtual image is to be displayed, and wherein the controller is further configured to display the virtual image corresponding to a predetermined action at a predetermined display position based on the information on the virtual image.

15. The device of claim 14, wherein the action performed by the virtual image is determined based on a type of the object.

16. The device of claim 10, wherein the information about the changed state of the peripheral device is provided to the device connected to the HMD device.

17. The device of claim 10, wherein the controller is further configured to provide a gesture information about a gesture of the user to the device, and receive operation information about a changed action performed by the virtual image based on the gesture information from the device.

18. A device for displaying a virtual image through a head mounted display (HMD) device, the device comprising:
a communicator; and
a controller configured to:
receive an image of an eye of a user from the HMD device,
receive information regarding an operation mode selected by the user from the HMD device, wherein the operation mode is a mode set for the virtual image to perform a predetermined action in a predetermined situation,
determine a position of the eye of the user based on the image of the eye of the user,
determine an object that is viewed by the user based on the determined position, determine an action performed by the virtual image based on the operation mode, provide information on the virtual image related to the object, wherein the information on the virtual image related to the object comprises a display position of the virtual image and operation information indicating an action performed by the virtual image, determined based on an operation mode of the virtual image selected by an interaction of the user with the HMD device, the display position of the virtual image comprises a first display position in response to the position of the eye of the user being a first position, and the display position of the virtual image comprises a second display position different from the first display position in response to the position of the eye of the user being a second position,
receive information about a changed state of a peripheral device connected to at least one of the HMD device or the device,
change the action performed by the virtual image in response to the received information about the changed state and the operation mode, and
provide information regarding the changed action performed by the virtual image to the HMD device,
wherein the action performed by the virtual image comprises at least one of an animation of a virtual object or a sound associated with the virtual object and the action performed by the virtual image in a first operation mode is different from an action performed by the virtual image in a second operation mode, and
wherein a plurality of actions performed by the virtual image are respectively matched with a plurality of states of the peripheral device, and the changed action performed by the virtual image is selected from among the plurality of the actions performed by the virtual image.

* * * * *